US012597058B2

(12) United States Patent
Shanker et al.

(10) Patent No.: US 12,597,058 B2
(45) Date of Patent: Apr. 7, 2026

(54) IDENTIFICATION OF ITEMS IN AN IMAGE AND RECOMMENDATION OF SIMILAR ENTERPRISE PRODUCTS

(71) Applicant: Target Brands, Inc., Minneapolis, MN (US)

(72) Inventors: Vishal Vijay Shanker, Minneapolis, MN (US); Guruprasad Somasundaram, Minneapolis, MN (US); Sachin Agarwal, Uttar Pradesh (IN)

(73) Assignee: Target Brands, Inc., Minneapolis, MN (US)

( * ) Notice: Subject to any disclaimer, the term of this patent is extended or adjusted under 35 U.S.C. 154(b) by 394 days.

(21) Appl. No.: 18/155,671

(22) Filed: Jan. 17, 2023

(65) Prior Publication Data

US 2024/0242260 A1    Jul. 18, 2024

(51) Int. Cl.
*G06Q 30/0601* (2023.01)
*G06V 10/74* (2022.01)

(52) U.S. Cl.
CPC ..... *G06Q 30/0631* (2013.01); *G06Q 30/0625* (2013.01); *G06Q 30/0643* (2013.01); *G06V 10/761* (2022.01)

(58) Field of Classification Search
CPC ........... G06Q 30/0631; G06Q 30/0625; G06Q 30/0643; G06V 10/761; G06V 10/00; G06F 18/00
See application file for complete search history.

(56) References Cited

U.S. PATENT DOCUMENTS

| | | |
|---|---|---|
| 7,062,083 B2 | 6/2006 | Lim et al. |
| 8,903,198 B2 | 12/2014 | Datta et al. |
| | (Continued) | |

FOREIGN PATENT DOCUMENTS

| | | |
|---|---|---|
| KR | 1020200021829 A | 3/2020 |
| WO | 2017117417 A1 | 7/2017 |

OTHER PUBLICATIONS

Ghadekar, Premanand, Image-Based Product Recommendation, Using Market Basket Analysis, Sep. 1, 2019, 2019 5th International Conference on Computing, Communication, Control and Automation (ICCUBEA), pp. 1-5 (Year: 2019).*

*Primary Examiner* — Marissa Thein
*Assistant Examiner* — Timothy J Kang
(74) *Attorney, Agent, or Firm* — Merchant and Gould, P.C.

(57) ABSTRACT

The present application relates to a system and method whereby an enterprise system can identify items within an image and recommend similar enterprise products to a consumer. In some examples, such a system may include an object detection component trained on a known dataset, which may be used to identify objects/items in an image. Cropped items of interest may be extracted from the image. The system may include an image embedding and category prediction component, which may generate embedding vectors and predict category information for the cropped images. A visual similarity search component, which may reference embeddings for product images to identify products which are visually similar to the items identified from the image. An attribute-based ranking process may be applied to rank the top recommended items obtained from the visual similarity search component. A final ordering of recommended items may then be provided to a consumer.

20 Claims, 12 Drawing Sheets

(56)     References Cited

U.S. PATENT DOCUMENTS

| | | | |
|---|---|---|---|
| 8,949,252 B2 | 2/2015 | Chittar et al. | |
| 10,776,417 B1 * | 9/2020 | Ravichandran | G06N 5/046 |
| 11,036,790 B1 | 6/2021 | Hohwald et al. | |
| 11,048,744 B1 | 6/2021 | Hohwald et al. | |
| 11,238,515 B1 * | 2/2022 | de Mesa | G06Q 30/0627 |
| 2018/0373955 A1 | 12/2018 | Soldevila et al. | |
| 2021/0150249 A1 * | 5/2021 | Zheng | G06V 10/255 |

* cited by examiner

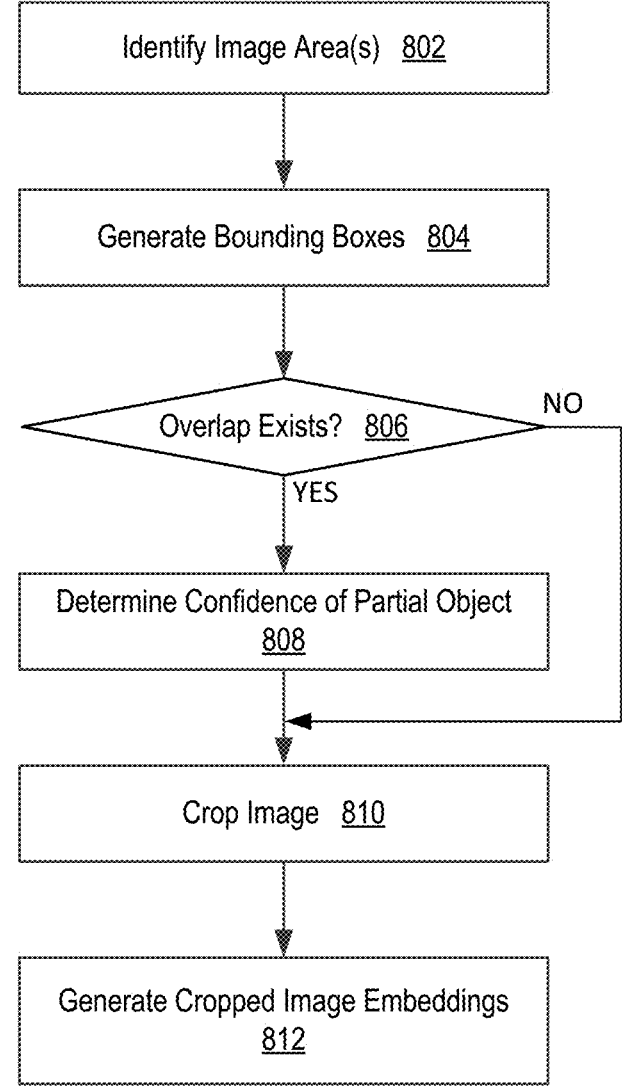
Identify Image Area(s)  802
Generate Bounding Boxes  804
Overlap Exists?  806
NO
YES
Determine Confidence of Partial Object
808
Crop Image  810
Generate Cropped Image Embeddings
812
800
FIG. 8

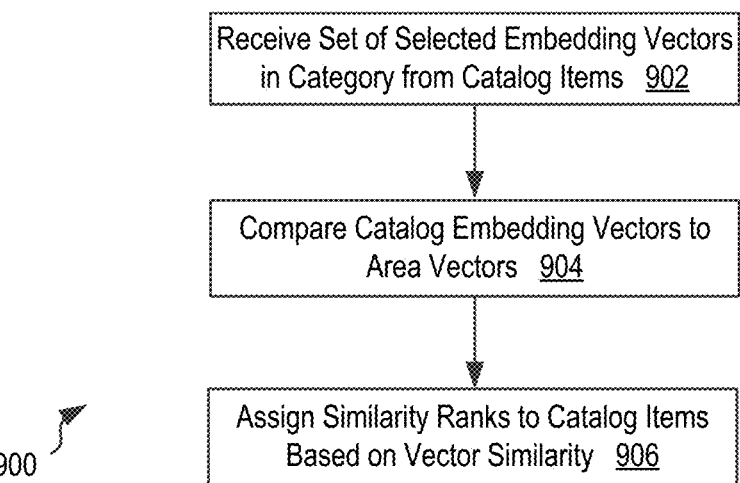

Receive Set of Selected Embedding Vectors in Category from Catalog Items   902

Compare Catalog Embedding Vectors to Area Vectors   904

Assign Similarity Ranks to Catalog Items Based on Vector Similarity   906

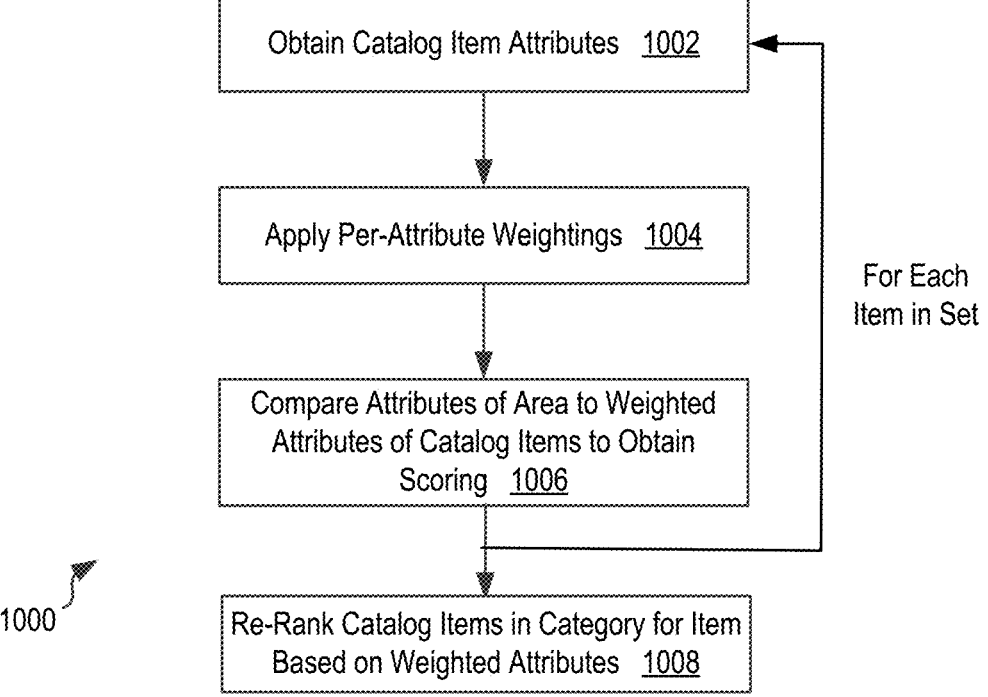

Obtain Catalog Item Attributes   1002

Apply Per-Attribute Weightings   1004

Compare Attributes of Area to Weighted Attributes of Catalog Items to Obtain Scoring   1006

For Each Item in Set

Re-Rank Catalog Items in Category for Item Based on Weighted Attributes   1008

IDENTIFICATION OF ITEMS IN AN IMAGE AND RECOMMENDATION OF SIMILAR ENTERPRISE PRODUCTS

BACKGROUND

A customer of an enterprise (e.g., a retailer) may see an image of apparel or home furnishings that the customer may wish to replicate. The enterprise may desire to recommend products to the customer which would allow the customer to purchase the products and re-create the aesthetic shown in the image. In some cases, a customer may view an image and may search a retail website of the enterprise for a similar item, to recreate that aesthetic. However, this is time-consuming, and will typically result in the customer losing interest and the enterprise not realizing a sale of an item.

In some cases, the enterprise itself may obtain images, which might include at least some items offered for sale by that enterprise (for example, images which originated from a social media post) and shown to a customer. These images may be manually tagged by enterprise personnel with items that they contain, where those items are known products sold by the enterprise. This manual tagging can be time-consuming and therefore costly. Additionally, other items may be present within the image which are not sold by the enterprise. In this situation, the enterprise may wish to identify similar items that are offered by the enterprise, to take the place of those unavailable items.

SUMMARY

A customer of an enterprise (e.g., a retailer) may see an image of apparel or home furnishings that the customer may wish to replicate. An enterprise system can identify items within the image and recommend similar enterprise products to the consumer may provide various benefits to both consumer and enterprise. In some examples, such a system may include an object detection component trained on a known dataset, which may be used to identify objects/items in an image and generate bounding boxes for identified items. The bounding boxes may be used to extract cropped items of interest from the image. In some examples, the system may include an image embedding and category prediction component (trained on enterprise catalog images), which may generate embedding vectors (numerical representations of images based on pixel information) and predict category information for the cropped images. In some examples, a visual similarity search component, which may reference embeddings for product images that are precomputed and stored in an embeddings database to identify products which are visually similar to the items identified from the image. An attribute-based ranking process may be applied in some examples, to rank the top recommended items obtained from the visual similarity search component. In some examples, the attribute-based ranking may compare attribute signals from the recommended items to extracted attributes of the item. The attributes may be individually weighted, and the ranked embedding scores provided, alongside attribute signals to a weighted average scoring process that may weigh different attributes of greater or lesser importance. A final ordering of recommended items may then be provided to a customer.

Accordingly, the present application describes a computing system including at least one processor; and at least one memory storing computer-executable instructions for recommending retail items similar to identified items in an image, the computer-executable instructions when executed by the at least one processor causing the computer to receive an image at an object detection model, the image depicting one or more unlabeled retail items. The instructions may also cause the computer to identify an area of the image, the area being a sub-region of the image and including an item from among the one or more unlabeled retail items, the area having a boundary; and predict a category of the item within the area using a model trained using images included within a retail item catalog of a retail enterprise, wherein each retail item has a plurality of retail item attributes. The instructions may also cause the computer to generate a set of embedding vectors associated with the area within the boundary, the embedding vectors being representative of the item; and receive a plurality of sets of catalog item embedding vectors, wherein each set of catalog item embedding vectors from among the plurality of sets of catalog item embedding vectors is associated with an image of a retail item that is included within the retail item catalog. The instructions may also cause the computer to compare the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog. The instructions may also cause the computer to, based on the comparison, assign a similarity rank to each retail item of the set of retail items; determine a plurality of item attributes associated with the item; and compare the retail item attributes associated with each item of the set of retail items to corresponding item attributes from among the plurality of item attributes of the item to obtain a plurality of attribute similarity scores, each of the retail item attributes having assigned to it a predetermined attribute weighting. The instructions may also cause the computer to, based on (a) the comparison of the retail item attributes to the corresponding item attributes of the item, and (b) the predetermined weighted attribute values, assign one or more attribute scores to each retail item of the set of retail items. The instructions may also cause the computer to assign a final ranking to each retail item of the set of the retail items, based on the similarity rank and the one or more attribute scores assigned to each retail item; and identify one or more recommended retail items of the set of retail items based on the final ranking.

The present application describes a method including receiving an image at an object detection model, the image depicting one or more unlabeled retail items. The method may also include identifying an area of the image, the area being a sub-region of the image and including an item from among the one or more unlabeled retail items, the area having a boundary; and predicting a category of the item within the area using a model trained using images included within a retail item catalog of a retail enterprise, wherein each retail item has a plurality of retail item attributes. The method may also include generating a set of embedding vectors associated with the area within the boundary, the embedding vectors being representative of the item; and receiving a plurality of sets of catalog item embedding vectors, wherein each set of catalog item embedding vectors from among the plurality of sets of catalog item embedding vectors is associated with an image of a retail item that is included within the retail item catalog. The method may also include comparing the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog. The method may also include, based on the comparison, assigning a similarity rank to each retail item of the set of retail items; determine a plurality of item attributes associated with the item; and comparing the retail item attributes associated with each item of the set of retail items to corresponding item attributes from among the plurality of item attributes of the item to obtain a plurality of attribute similarity scores, each of the retail item attributes having assigned to it a predetermined attribute weighting. The method may also include, based on (a) the comparison of the retail item attributes to the corresponding item attributes of the item, and (b) the predetermined weighted attribute values, assigning one or more attribute scores to each retail item of the set of retail items. The method may also include assigning a final ranking to each retail item of the set of the retail items, based on the similarity rank and the one or more attribute scores assigned to each retail item; and identifying one or more recommended retail items of the set of retail items based on the final ranking.

The present application describes an item matching system for a retail website including an apparel item matching system implemented on a computing system, the apparel item matching system being configured to receive an image at an object detection model, the image depicting one or more unlabeled retail items; and identify an area of the image, the area being a sub-region of the image and including an item from among the one or more unlabeled retail items, the area having a boundary. The apparel item matching system may also be configured to predict a category of the item within the area using a model trained using images included within a retail item catalog of a retail enterprise, wherein each retail item has a plurality of retail item attributes; and generate a set of embedding vectors associated with the area within the boundary, the embedding vectors being representative of the item. The apparel item matching system may also be configured to receive a plurality of sets of catalog item embedding vectors, wherein each set of catalog item embedding vectors from among the plurality of sets of catalog item embedding vectors is associated with an image of a retail item that is included within the retail item catalog. The apparel item matching system may also be configured to compare the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog. The apparel item matching system may also be configured to, based on the comparison, assign a similarity rank to each retail item of the set of retail items; and determine a plurality of item attributes associated with the item. The apparel item matching system may also be configured to compare the retail item attributes associated with each item of the set of retail items to corresponding item attributes from among the plurality of item attributes of the item to obtain a plurality of attribute similarity scores, each of the retail item attributes having assigned to it a predetermined attribute weighting; and, based on (a) the comparison of the retail item attributes to the corresponding item attributes of the item and (b) the predetermined weighted attribute values, assign one or more attribute scores to each retail item of the set of retail items. The apparel item matching system may also be configured to assign a final ranking to each retail item of the set of the retail items, based on the similarity rank and the one or more attribute scores assigned to each retail item; and identify one or more recommended retail items of the set of retail items based on the final ranking. The item matching system may also include a retail web server communicatively connected to the computing system on which the apparel item matching system is implemented, the retail web server being configured to generate a user interface including the image, the recommendation, and an option to purchase the recommended retail item.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 8 illustrates an example method for identifying and extracting an object from an image, according to an example.

FIG. 9 illustrates an example method for assigning similarity rankings to catalog items, according to an example.

FIG. 10 illustrates an example method for assigning rankings to catalog items based on weighted attributes, according to an example.

DETAILED DESCRIPTION

Figure 1:
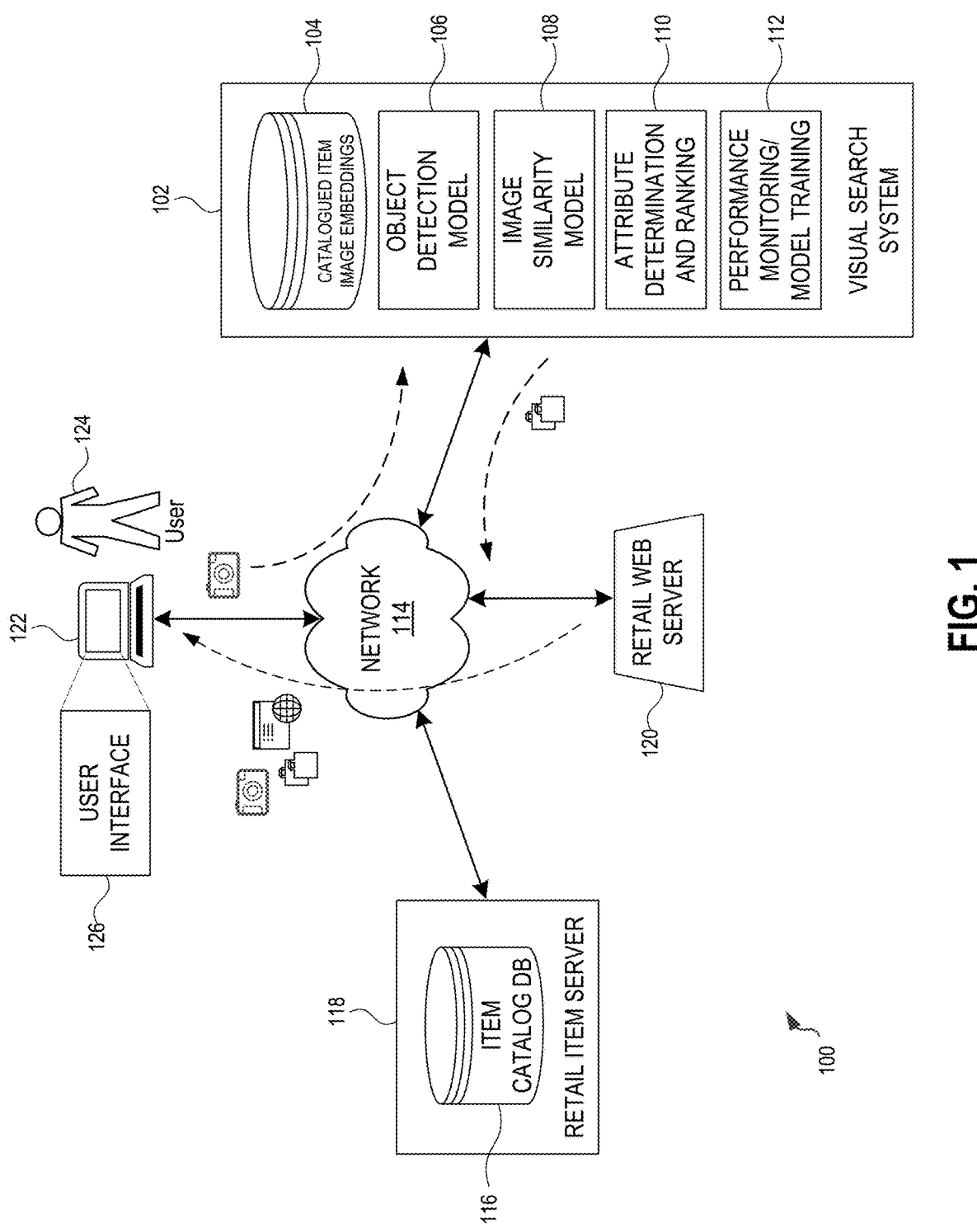
FIG. 1 illustrates an example system for identifying items in an image and recommending similar retail items, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A customer (or potential customer) of an enterprise (for example, a retail enterprise) may see an image of apparel or home furnishings that the customer may wish to replicate. An enterprise system which can identify those items within the image and recommend similar enterprise products to the consumer may provide various benefits to both consumer and enterprise. Generally, such a system may allow users to identify individualized items within a multi-item image, and separately identify recommended, matching items from the enterprise item catalog. This may allow guests to quickly identify the most similar items available for purchase from the enterprise without having to separately navigate to and search within item (e.g., apparel, home furnishings) categories to manually identify close match items.

In some examples, an enterprise may receive images (e.g. photographs) from external sources, such as social media posts. These social media posts may be made by customers or other social media users who may indicate (e.g. with a "tag," "hashtag," or "at") that one of the items within the photograph is a product sold by the enterprise. The product may be identified by the customer who authored the social media post, or by an enterprise user once the image has been received by the enterprise, and the image may be tagged with the product information. Other customers may view these images, for example, on the enterprise's webpage or social media pages, and may be presented with a user interface which displays the image and the tagged product, alongside an option to add to the item to a guest shopping cart. This manual tagging can be time-consuming, inefficient, and costly. Additionally, other items may be present within the image which are not sold by the enterprise, and the enterprise may wish to identify those items and recommend products to the consumer which are similar to those items. An enterprise system which can identify those items within the image and recommend similar enterprise products to the consumer may provide various benefits to both consumer and enterprise.

In some examples, such a system may include an object detection application, which may be trained on a known data set is used to generate bounding boxes. This object detection application may identify items of interest in an image (e.g. pants, a shirt, a purse, a lamp, a rug). The bounding boxes may be used to define an area or number of pixels corresponding items/object of interest which may be similar to products sold by the enterprise. The cropped areas may define areas to be cropped from the image. In some examples, a system may also include an image embedding application which may generate one or more embedding vectors (numerical representations of images based on pixel information) corresponding to the item within the bounding box. In some examples, the embedding application may predict categories (category information) of the item. The embedding application may be trained on embedding vectors associated with enterprise catalog images (images associated with products sold by the enterprise).

The system may also include a similarity search application, which may compare the embedding vectors generated for the identified item with embedding vectors for product images that are precomputed and stored in an item catalog embedding vector database to identify visually similar items. The items may then be ranked by visual similarity.

In some examples, the system may include an attribute model, which may identify attributes associated with the identified item. The system may also include an attribute-based ranking application, which may then be applied to re-rank the top ranked products obtained from the similarity search application, by comparing attributes assigned to the products to extracted identified attributes of the identified item (e.g., color, neckline, pattern, etc.). In some examples, different attributes may be individually weighted, and a weighted average scoring process may score different attributes of greater or lesser importance a higher or lower weight. Based on the weightings of attributes from among the visually similar items, a final ordering/ranking of recommended products similar to the identified item may be determined.

In some examples, the top re-ranked product may be provided to a customer who is viewing the image, and may be displayed alongside purchase options, such as the option to add the item to a virtual shopping cart. This may allow a customer to view an image and select products available for purchase from the enterprise in order to re-create an aesthetic (for example, a hat, shirt, pants, and shoes to form an outfit of the image; or a lamp, table, couch, and rug to form a room style of the image), even when not all of the items within the image were originally purchased from the enterprise.

These and other examples will be explained in more detail below with respect to FIG. 1-FIG. 13.

FIG. 1 illustrates an example system 100 for identifying items in an image and recommending similar retail items. As will be described in more detail below, the system 100 may include a visual search system 102, a network 114, a retail item server 118, a retail web server 120, a device 122, a user 124, and a user interface 126.

In an example, visual search system 102 may include a catalogued item image embeddings database, an object detection model 106, an image similarity model 108, an attribute determination and ranking application 110, and/or a performance monitoring and model training application 112. Visual search system 102 may receive information and send information via network 114.

In some examples, as described herein, network 114 may include a computer network, an enterprise intranet, the Internet, a LAN, a Wide Area Network (WAN), wireless transmission mediums, wired transmission mediums, other networks, and combinations thereof. Although network 114 is shown as a single network in FIG. 1, this is shown as an example and the various communications described herein may occur over the same network or a number of different networks.

In an example, user 124 is an employee, operator, manager, or other agent of the enterprise. In another example, user 124 is a customer, potential customer, or guest of the enterprise. User 124 may desire to purchase a retail product from the enterprise. For example, user 124 may be a customer who presents an image to the visual search system. The image may be presented in various ways, for example, by selecting from an image which was present on a user interface, by uploading an image, or by locating an image which has been tagged (for example, from a social media application). The user 124 may desire to purchase one or more items the same as or similar to items which appear in the presented image. The items may relate to apparel, accessories, home furnishings, toys, furniture, lighting, paint, or any other category or retail items/goods. The items may be sold online or in a physical store of the enterprise.

The image may have originated from a camera, and may have been taken, in some examples, by a customer (such as user 124), an enterprise marketing user, or a social media user. In some instances, the image may originate external from the user or enterprise, and may be ingested from an image repository (e.g., an online catalog, third party website, or the like).

Figure 2:
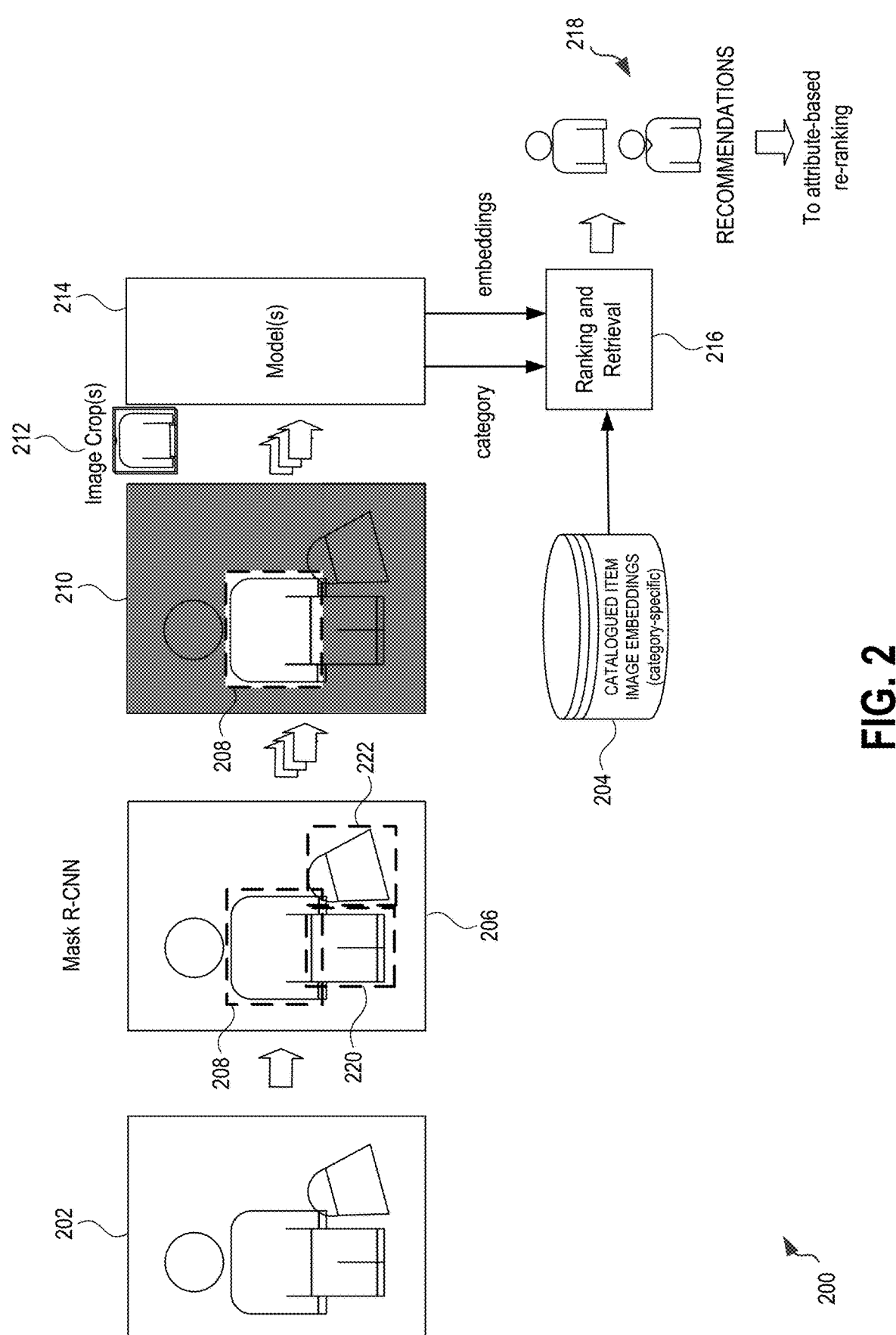
FIG. 2 illustrates an example process flow diagram for identifying items in an image and categorizing the items, according to an example.
Figure 3:
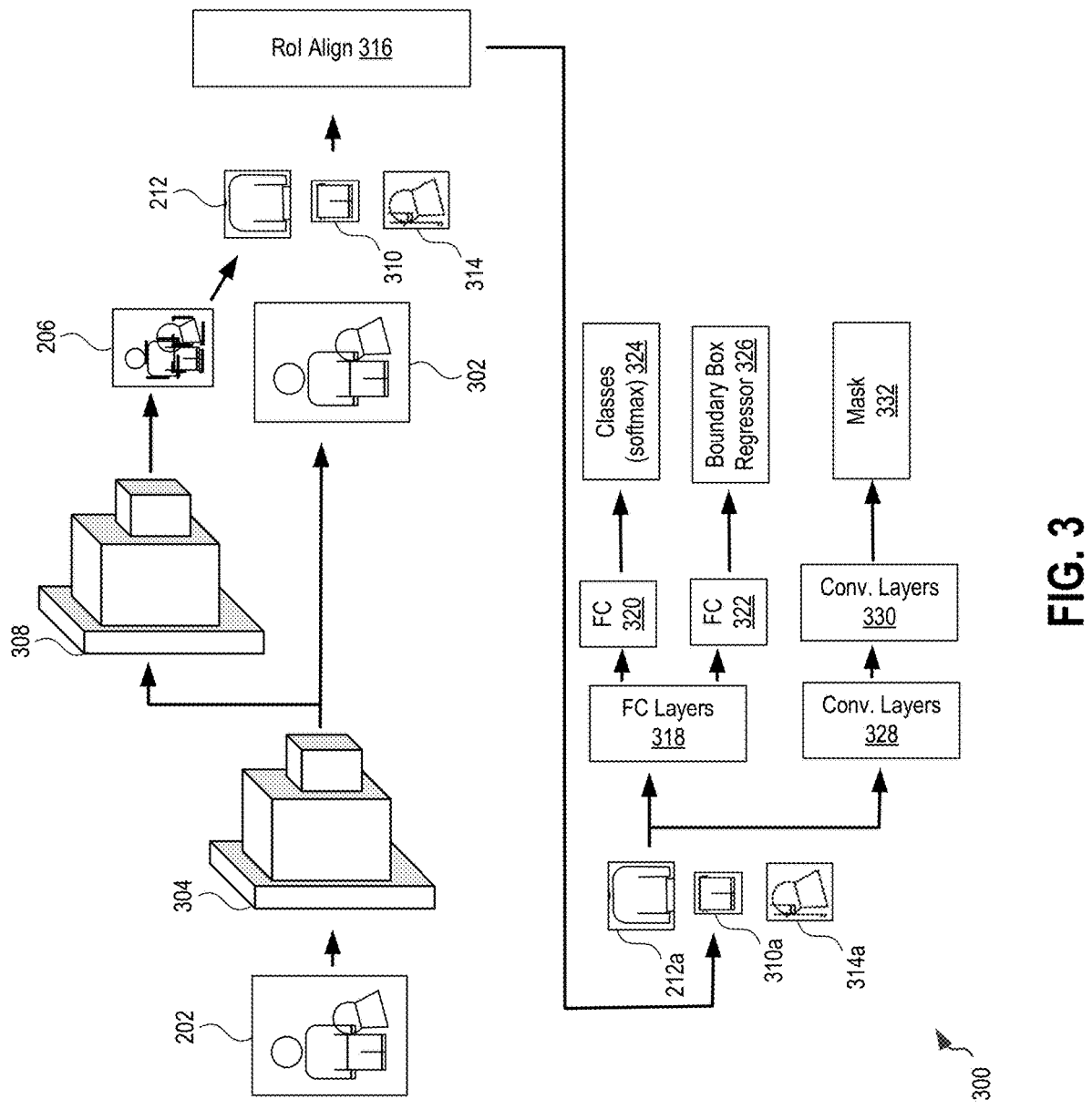
FIG. 3 illustrates an example system for identifying items in an image and categorizing the items, according to an example.

In some examples, object detection model 106 is configured to, upon receipt of an image from a user 124, detect items in the image. For example, items such as home furnishings or apparel may be identified, so that user 124 may eventually purchase the same or similar items from the retail enterprise. Refer to FIGS. 2,3, and 8 for more detailed descriptions of object detection and extraction. In some examples, object detection model 106 may be an artificial intelligence or machine learning model. One or more items may be identified in a particular image.

Figure 4:
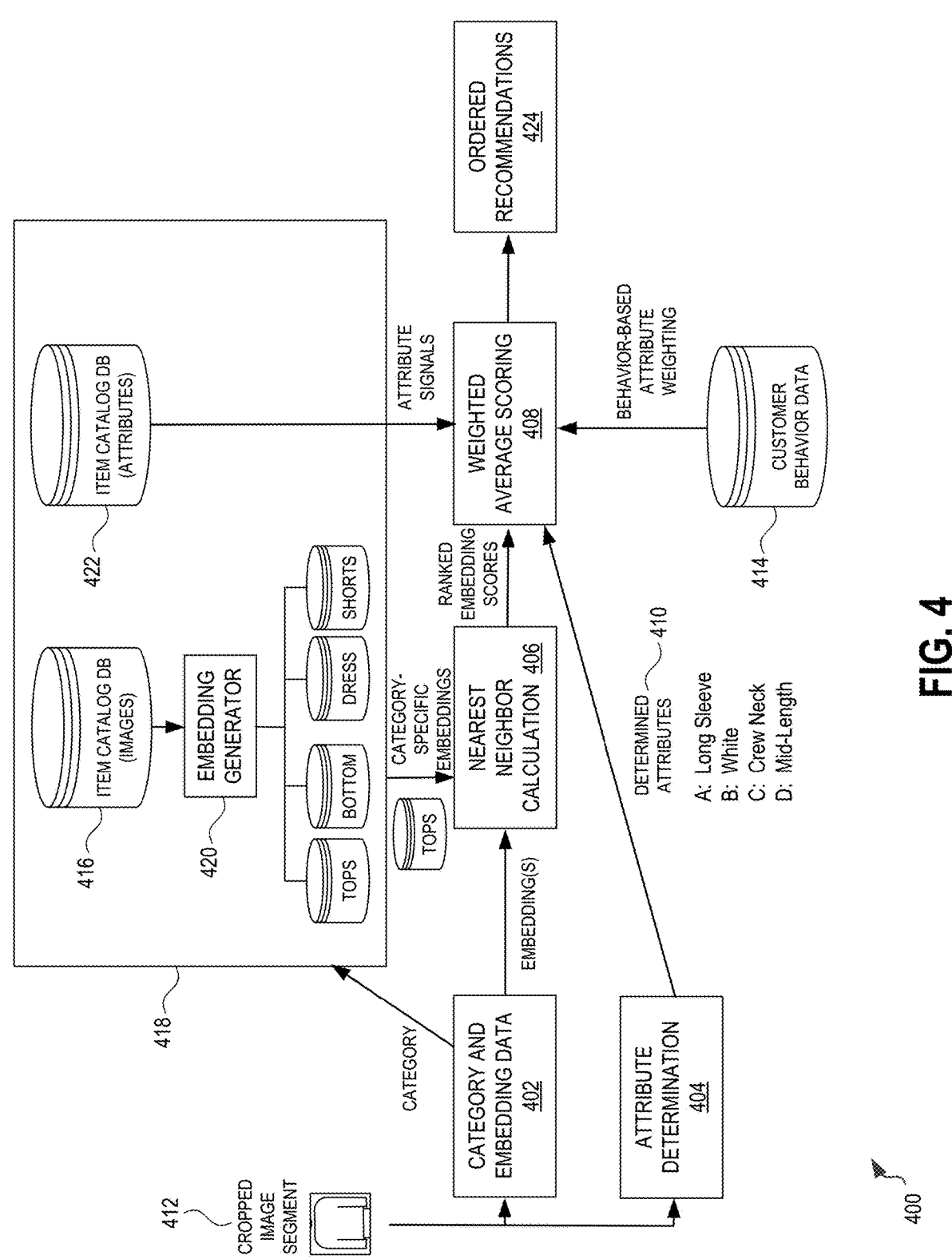
FIG. 4 illustrates an example process flow diagram for determining attributes associated with an identified item of an image and generating recommendations of similar retail items, according to an example.
Figure 7:
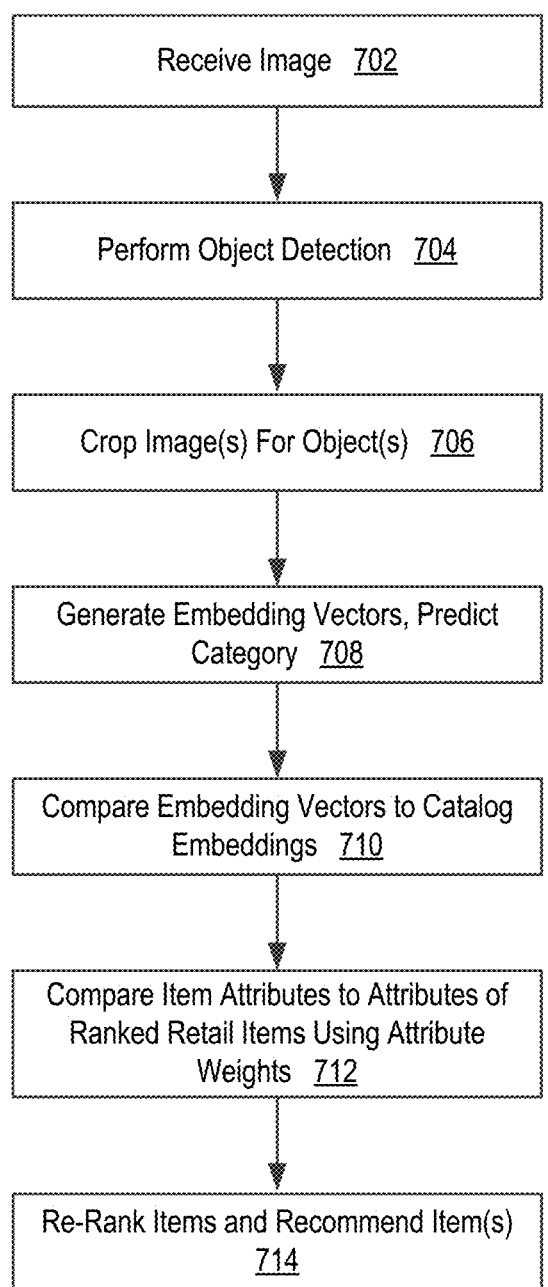
FIG. 7 illustrates an example method for recommending retail items similar to identified items in an image, according to an example.

In some examples, image similarity model 108 is configured to predict a category of the item(s) identified by object detection model 106. One or more categories may be identified for a particular item. The categories may correspond to retail item categories, such as apparel, accessories, home furnishings, toys, furniture, lighting, paint, or any other category or retail items/goods. In some examples, broader categories of items may have one or more layers of sub-categories. For example, the apparel category may have sub-categories of women, men, children, infants, dogs, and cats. The sub-category of women may have further sub-categories of tops, bottoms, dresses, shorts, and shoes. Image similarity model 108 may, in some examples, predict categories at any level (broad or sub-categories). Refer to FIGS. 4 and 7 for further description of category predictions.

In some examples, catalogued item image embeddings database 104 may be virtual (e.g. cloud-based); in other examples, catalogued item image embeddings database 104 may network or drive-based. Catalogued item image embeddings database 104 may include catalogued item image embedding vectors. In example embodiments, the catalogued item image embedding vectors may correspond to (an image of) a retail item. In some examples, the retail item is an item available for sale by/purchase from the enterprise. In some examples, the item image embedding vectors may be associated with retail item images stored in item catalog database 116, described below. In some examples, the item image embedding vectors may be pre-generated and stored according to retail item categories (as described above). Refer to FIG. 2 for further description of an example retail item image embeddings database. In some further examples, the catalogued item image embedding vectors may correspond to a predicted item identified, for example, by object detection model 106. In some examples, the item image embedding vectors may be stored according to predicted retail item categories (as described above).

In some examples, attribute determination and ranking application 110 is configured to determine attributes of each item detected in the image. Attributes may include features of the item, such as characteristics, shape, type, or color. In some examples, attributes may be based on the predicted item category. In a particular example, if an item is recognized as being in the home furnishings category, features may include type, material, shape, and/or color. In that particular example, determined attributes may be dining table, wood, rectangular, and brown. In another particular example, if an item is recognized as being in the apparel category (and potentially a shoes subcategory), features may include style, fastener, shape, and/or color. In that particular example, determined attributes may be heel/pump, ankle strap, pointed toe, and red. Refer to FIGS. 4 and 7 for further description of attribute determination. In some examples, attribute determination and ranking application 110 may include an artificial intelligence or machine learning model. In some examples, attribute determination and ranking application 110 includes at least one other type of model.

Figure 11:
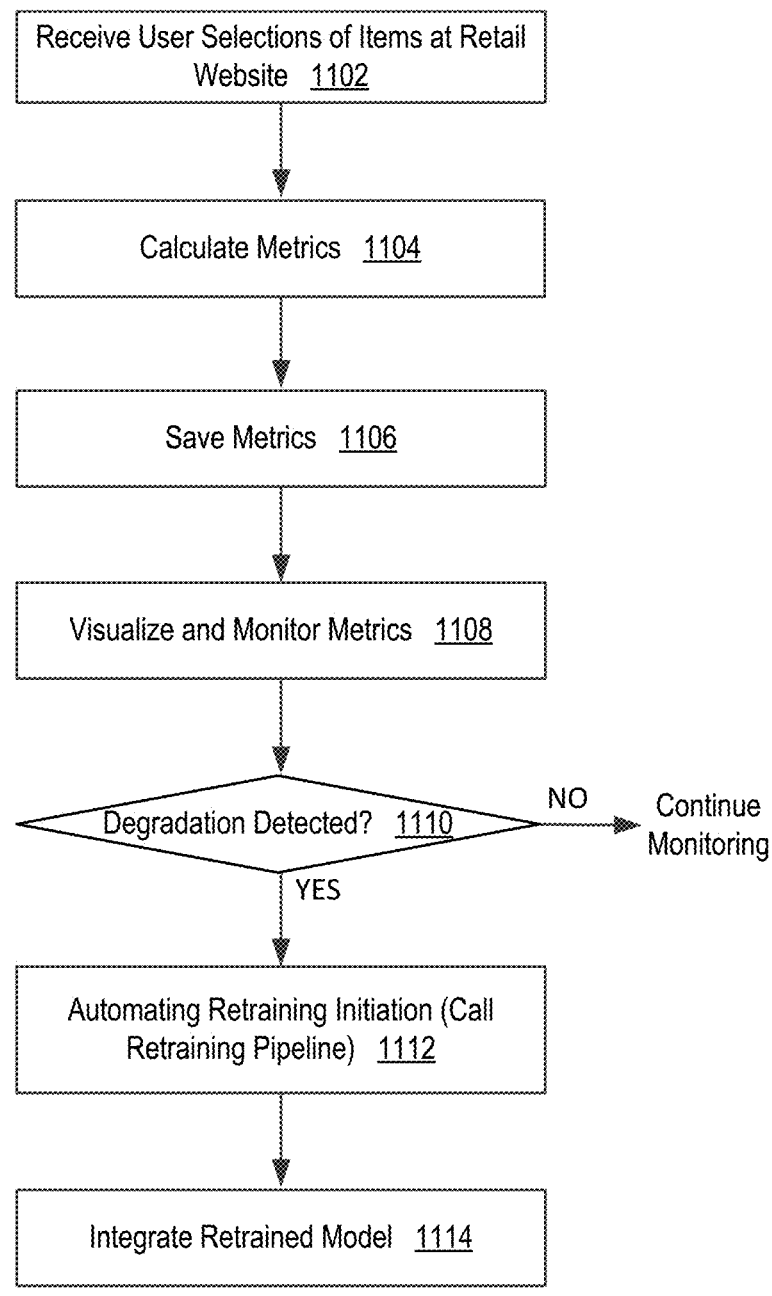
FIG. 11 illustrates an example method for detecting degradation of quality of a model output and retraining the model, according to an example.
Figure 12:
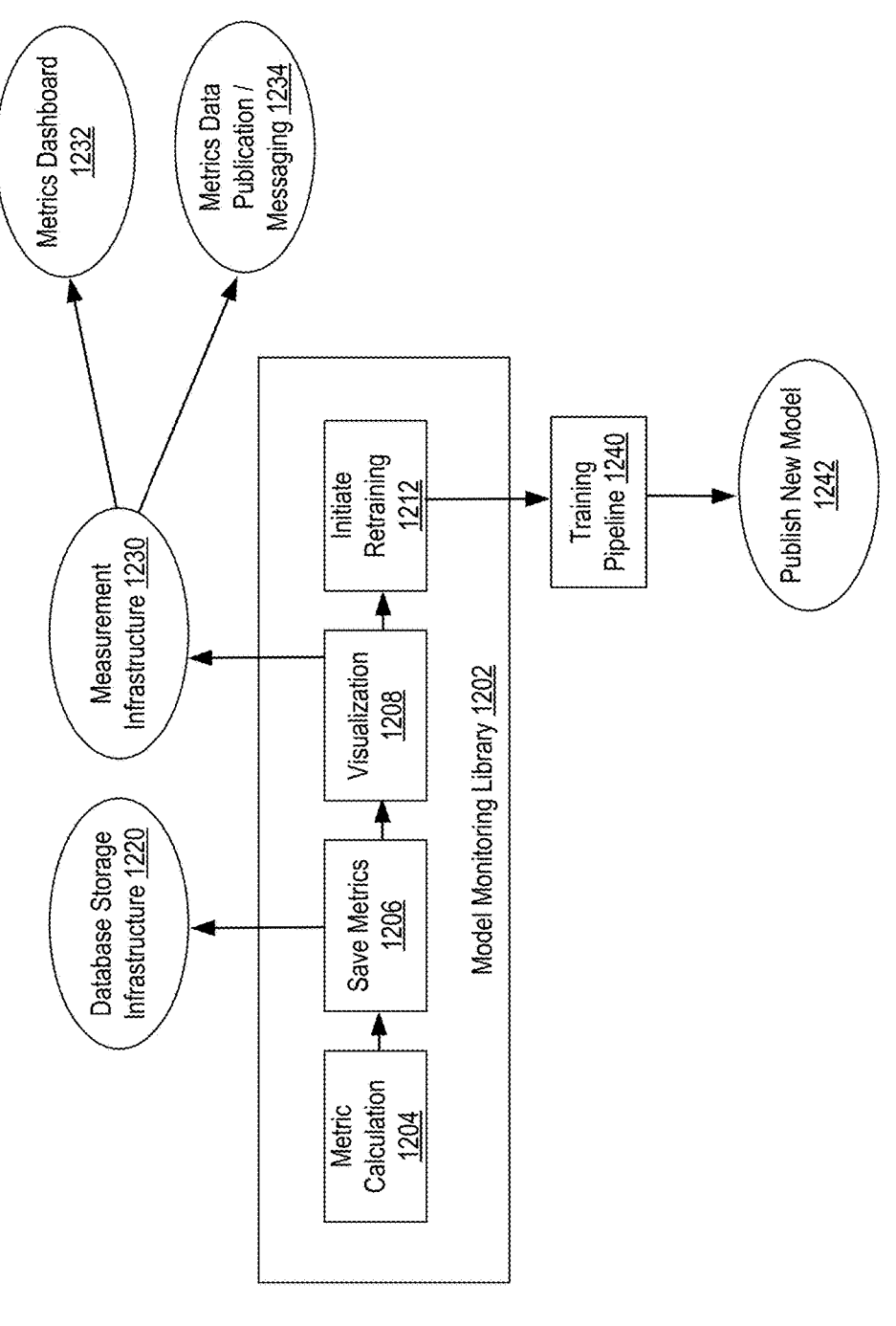
FIG. 12 illustrates an example process flow for detecting degradation of quality of a model output and retraining the model, according to an example.

In some examples, performance monitoring and model training application 112 is configured to monitor the performance of the models and applications within the visual search system. In some examples, performance monitoring and model training application 112 is configured to automatically retrain models and applications when a performance deficiency is noticed. Refer to FIGS. 11 and 12 for more description of performance monitoring and model retraining. In some examples, performance monitoring and model training application 112 is a singular application/system. In some examples, performance monitoring and model training application 112 are separate applications/systems in communication with one another and with visual search system 102.

In some examples, a retail item server 118 may include an item catalog database 116. In some examples, retail item server 118 may include other applications and/or databases. In some examples, item catalog database 116 may be virtual (e.g. cloud-based); in other examples, item catalog database 116 may network or drive-based. Item catalog database 116 may include images of retail items of a retail enterprise catalog. The images of retail items may be stored according to retail item categories (as described above). In some examples, item catalog database 116 may include attributes of retail items. In some examples, the retail item is available for sale by/purchase from the enterprise. Refer to FIG. 4 for further description of an example retail item image embeddings database.

In some examples, as described herein, the device 122 may be a desktop computer, a laptop computer, a tablet, a cell phone, a smart TV, a smart wearable device, or other appropriate electronic device which is capable of displaying the user interface 126.

In an example, user interface 126 is a web application. In other examples, user interface 126 is a device application. In some examples, user interface 126 allows user 124 to view a selected image and recommended items. In some examples, user interface 126 allows user 124 to select one or more of the recommended retail items for purchase (for example, to add to an online shopping cart for purchase online and subsequent delivery, to orchestrate shipment to a pickup location, or to reserve for pickup at a store location). In some examples, item purchase may be facilitated by the retail web server 120. User interface 126 may display, in some examples, images which are stored or accessed/received by retail web server 120.

In some examples, retail web server 120 may be a server associated with the retail enterprise. Retail web server 120 may, in some examples, be in communication with various enterprise entities, systems, and databases, such as retail item stock levels, purchasing, marketing, image storage, social media management, warehouses, shipment carriers, and others.

FIG. 2 illustrates an example process flow diagram illustrating identifying items in an image and categorizing the items. In some examples, object/item detection may be performed by a system such as object detection model 106 as described above in FIG. 1 and below in FIG. 3. Object extraction is further discussed in FIG. 8.

In an example, an image 202 is presented. In some examples, the image 202 is a marketing image which was selected by a potential customer user. In some examples, the image 202 was uploaded by another user, for example via a social media platform which was selected by a potential customer user. In some examples, image 202 is uploaded by the customer user. In a particular example as shown, an image 202 may be of a person wearing clothing/apparel and carrying an accessory.

Areas of the image 202 that contain potential items 208, 220, and 222 are detected, for example, by an object detection model. Bounds may be added to the image 206, around each of the potential item areas. In a particular example as shown, bounds may be placed around each item of potentially identified clothing/apparel and the accessory, such as a shirt, trousers, and a handbag. In some examples, as described below in FIG. 3, Mask R-CNN may be used to detect the potential items and/or generate the bounds/bounding boxes around them.

For each potential item 208, 220, 222, the image is cropped according to the bounds around the area, and the cropped image is evaluated by one or more models 214. In a particular example, potential item 208 (which may be a clothing item and, as shown, is a shirt) may be cropped into image crop 212, which may be analyzed by model(s) 214. Model(s) 214 may include, in some examples, object detection model 106, image similarity model 108, and/or attribute determination and ranking model 110.

Model(s) 214 may predict a category associated with the image crop 212. Model(s) 214 may generate embeddings (embedding vectors) associated with the image crop 212. In a particular example, one or more categories associated with the image crop 212 may include shirts, apparel.

Catalogued item image embeddings 204 database (for example, according to the description of catalogued item image embeddings 104) may include a subset of catalogued item image embeddings which are category-specific to the category predicted for image crop 212. In a particular example as shown, an appropriate category may be apparel or a shirt/top.

The predicted category, generated embedding vectors, and category-specific catalogued item embeddings may be utilized further in a ranking and retrieval process 216. Recommended catalog retail items 218 (for example, one or more shirts), based off of the ranking and retrieval process 216 may then be subject to attribute-based re-ranking to determine which item(s) to present to the user. Refer to FIGS. 4, 5, 7, 9, and 10 for more detailed descriptions of the ranking process, retrieval of recommended catalog retail items 218 (for example, one or more shirts), and attribute-based re-ranking.

The object detection process 200 as shown may be performed for each potential item 208, 220, 222 as was described for potential item 208 (which was cropped into image crop 212). Each will be bounded, cropped, evaluated by models 214, and move through the recommendation and attribute-based re-ranking processes. The object detection process for each potential item 208, 220, 222 may occur in parallel in some examples (at the same time or in a step-wise fashion) or in series (one after another) in other examples.

In some examples, when the bounding boxes are created, an overlap may be detected. For example, one potential item 208, 220, 222 may be partially obscured by one or more other items, such as a pair of socks partially hidden by a pair of shoes and trousers, a shirt hidden partially by a jacket, or a handbag held partially behind a scarf. In an example, if overlap is detected between the bounding boxes of two or more potential items 208, 220, 222, the system may be able to determine the confidence of accurately extracting the (partially obscured) potential item. In some examples, if the confidence level exceeds a predetermined threshold, the image may be cropped to generate a cropped image as described above. Refer to FIG. 8 for further description of detecting overlap in potential item bounding boxes.

FIG. 3 illustrates an example system for identifying items in an image and categorizing the items. In some examples, system 300 may represent a model such as object detection model 106. In some examples, system 300 may perform processes and methods such as those described in FIGS. 3 and 8. In some examples, system 300 may define a Mask R-CNN architecture. Mask R-CNN is a convolutional neural network (CNN) which detects items in an image by extracting areas/regions of interest from the input image and then classifying those regions as a potential item.

In some examples, an image 202 is received by the system 300 at convolutional network 304. Convolutional network 304 may segment the pixels of the image 202, in some examples, by instance segmentation, to extract features from the image 202.

In some examples, the segmented image 302 is received by region proposal network (RPN) 308. RPN 308 may identify one or more areas/regions (which correspond to potential items) of the segmented image 206 and may generate bounding boxes around each area/region. The area of each bounding box is cropped to generate an image crop 212, 310, 314.

At Region of Interest (RoI) Align 316, each image crop 212, 310, 314 is aligned so that detected image features (including pixels) align with the image 202 input. This generates aligned image crops 212*a*, 310*a*, 314*a*, which have been aligned to the same or similar size/shape and which are received by two parallel analysis streams.

Aligned image crops 212*a*, 310*a*, 314*a* are received by layers 318 (e.g., fully connected layers) included within the convolutional network. A further set of layers 320 (which may also be fully-connected layers) compare vectors of the extracted features of each aligned image crop with potential object classes and determines an object category/class 324. A set of fully-connected layers 322 compares vectors of the extracted features of each aligned image crop with coordinates of the boundary boxes and determines a tuned boundary box regressor 326.

Aligned image crops 212*a*, 310*a*, 314*a* are received consecutively by convolutional (Conv) layers 328 and then convolutional layers 330. The convolutional layers 328, 330 generate masks for each category/class, and determine a final mask 332 based on the object category/class 324.

Accordingly, the system 300 results in output of sized boundary boxes associated with each detected image, as well as a particular object category/class for the item within that boundary box, and a mask to be applied to the overall image.

In some examples, the object detection model of system 300 is trained on a dataset of images with defined items in groups and with annotated attributes, for example, an iMaterialist dataset. Other training datasets may be used as well.

FIG. 4 illustrates an example process flow diagram for determining attributes associated with an identified item of an image and generating recommendations of similar retail items. In some examples, process 400 may be performed by an attribute determination and ranking application such as attribute determination and ranking application 110.

In some examples, a cropped image segment 412 is received at category and embedding data application 402. In some examples, cropped image segment 412 has been cropped from a received image (for example, image 212 as previously described), and has had an object/item contained within its cropped area identified by a system such as system 300, described above. In a particular example, cropped image segment 412 includes a shirt.

In some examples, category and embedding data application 402 predicts category information of the item within the cropped image segment 412 and generates embedding vectors associated with the cropped image segment 412. In some examples, embedding vectors are numerical representations of images based on pixel information. In some examples, category and embedding data application 402 may utilize a model such as a machine learning or artificial intelligence model (for example, a Pytorch Metric learning model such as ProxyNCA loss). The embedding vectors may be compared, pairwise, against embeddings associated with all or a portion of the images included within a set of pre-computed embeddings that are In some examples, the model may construct task-specific distance metrics from the image data.

In some examples, a retail item server 418 (for example, such as retail item server 118) may include item catalog database 416 (for example, such as item catalog database 116). Item catalog database 416 may include images of retail items. Retail item server 418 may also include embedding generator 420, which generates catalog embedding vectors associated with the retail items. The catalog embedding vectors associated with the retail items may be stored (for example, in the same or different databases) based on categories of the retail item. In a particular example as shown, catalog embedding vectors which relate to items in a broader apparel category may be further stored based on whether they are tops/shirts, bottoms, dresses, or shorts.

In some examples, the generated image embeddings (relating to cropped image segment 412) and the category-specific catalog image embeddings (from retail item server 418, for example, relating to tops/shirts, may be received at a visual similarity search application. In some examples, the visual similarity search application may include a nearest neighbor calculation 406 (for example, K-Nearest Neighbors (KNN)). The cropped image embeddings and the catalog image embeddings are compared using a distance metric (for example, a cosine distance) to determine the top K catalog (retail) items which are most visually similar to the cropped image. The nearest neighbor calculation 406 may generate a ranked list of visually similar catalog items (a ranked list of embedding vectors) as initial recommendations.

In some examples, the cropped image segment 412 is received at an attribute determination application 404. In some examples, attribute determination application 404 may be implemented using the convolutional neural network model described above in conjunction with FIG. 3, in particular portions of that network used to generate the object category/class 324, and may determine one or more attributes associated with the item of the cropped image segment 412. That is, in examples, embeddings extracted from an image may be passed to a softmax layer, as seen in FIG. 3, to generate probabilities of various attributes being present in a cropped image segment 412. In some examples, the attributes may be initially generated from a cropped image segment 412, but may also be informed, at least partially, based on the predicted category of the item determined using category and embedding data application 402. In a particular example, where cropped image segment 412 includes a shirt and is identified as such with a high probability, additional attribute types may be assessed and assigned, for example sleeve length, color, neckline, and/or torso length. In the particular example, determined attributes 410 may be assigned to the cropped image segment 412 of: long sleeve, white, crew neck, and mid-length.

In some examples, retail item server 418 may also include an item catalog database 422, which may include attributes associated with the retail items.

Figure 5:
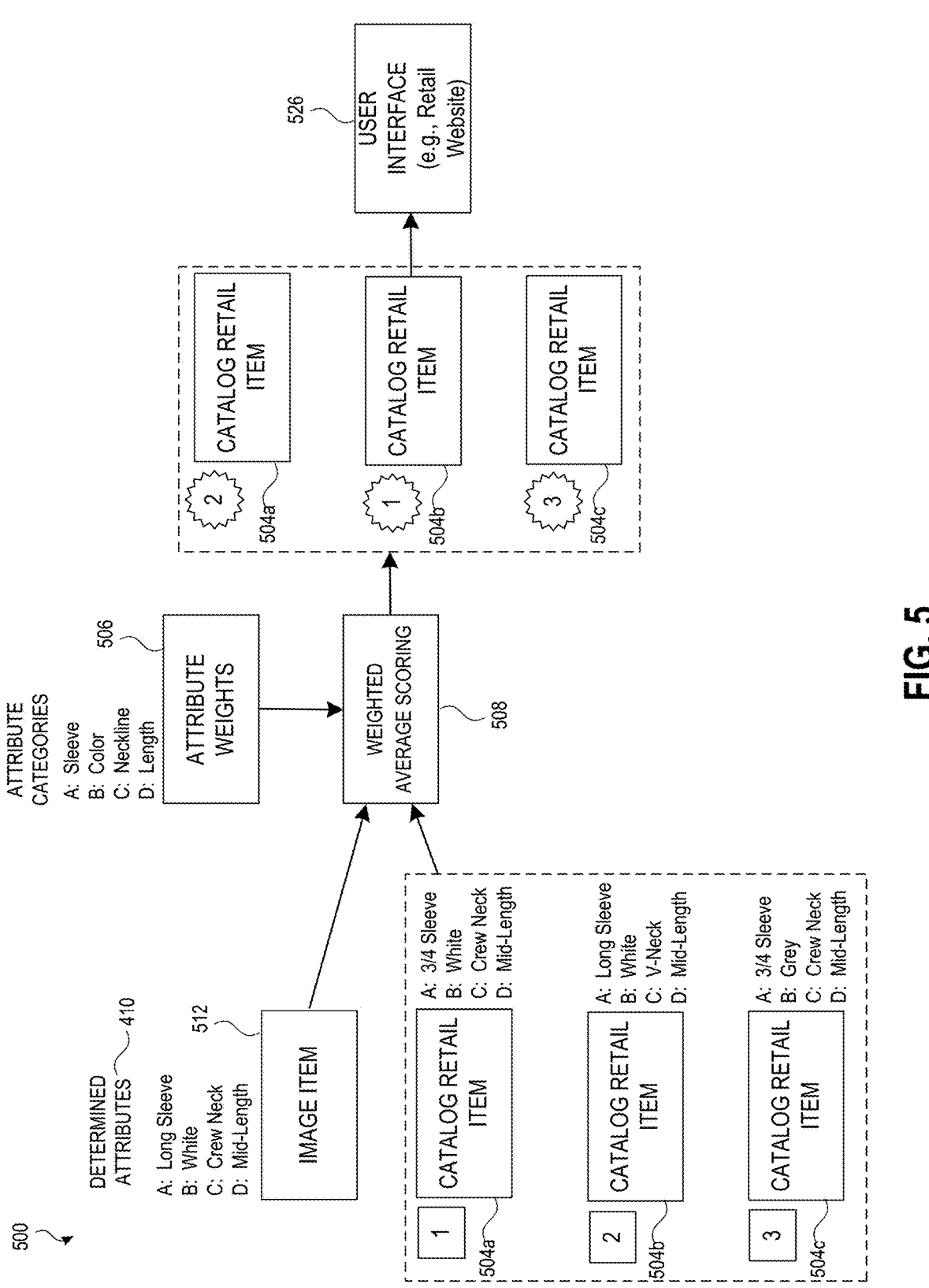
FIG. 5 illustrates an example process flow diagram for ranking recommended items based on item attributes, according to an example.

In some examples, a weighted average scoring application 408 receives and utilizes attribute signals (associated with one or more of the ranked/scored list of visually similar catalog items) from the item catalog database 422 in comparison with the determined attributes 410 of the cropped image segment 412 item to perform attribute-based reranking on the ranked/scored list of initial recommendations from the nearest neighbor calculation 406 for determination of a final set of more accurate ordered recommendations 424. Refer to FIG. 5 for additional disclosure of the weighted average scoring/attribute re-ranking process 408.

In some examples, where there are more than one image segment cropped from a single input image, then the process 400 may be performed for each of the cropped image segments, generating catalog item recommendations for each of the items recognized within the cropped image segments.

FIG. 5 illustrates an example process flow diagram for (re)ranking recommended items based on weighted item attributes. In some examples, process 500 may be as described in weighted average scoring 408 and FIG. 10.

The image item 512 (for example as associated with image 212 and cropped image segment 412) may have associated with it one or more determined attributes, such as attributes 410 as described above. In a particular example, image item 512 is a shirt and the determined attributes 410 include sleeve length (long sleeves), color (white), neckline (crew neck), and length (mid-length).

A ranked list of one or more initial catalog retail item recommendations 504a, 504b, 504c may be received (for example, from an item catalog database 422) as output from a visual similarity search (such as nearest neighbor calculation 406). In some examples, each of the catalog retail items 504a, 504b, 504c may have one or more attributes in common with the image item 512. In a particular example as shown, three catalog retail items are initially recommended and ranked "1," "2," and "3." In a particular example, catalog retail item 504a is associated with attributes including sleeve length (¾ sleeve), color (white), neckline (crew neck), and length (mid-length). In a particular example, catalog retail item 504b is associated with attributes including sleeve length (long sleeve), color (white), neckline (V-neck), and length (mid-length). In a particular example, catalog retail item 504c is associated with attributes including sleeve length (¾ sleeve), color (grey), neckline (crew neck), and length (mid-length).

In an example, each of the attribute types/categories (in a particular example, sleeve (length), color, neckline, and length) are assigned an attribute weight(s) 506. In some examples, the attribute weights 506 are based on visual impact and/or importance. In some examples, the attribute weights 506 are based off of an importance value obtained from consumers/customer preference.

At the weighted average scoring application 508 (reference also weighted average scoring application 408), the attribute weights 506 may be applied to each of the attributes of the catalog retail items 504a, 504b, 504c as compared to the determined attributes 410 of the image item 512. In a particular example, if sleeve length has a higher weight than neckline, catalog retail item 504b may receive a higher rank/score than catalog retail item 504a, because catalog retail item 504b has a sleeve length attribute in common with image item 512 (but not a neckline), while catalog retail item 504a has a neckline attribute in common with image item 512 (but not a sleeve length).

Once the weights have been applied, a new ranking/score may be obtained for each of the catalog retail items 504a, 504b, 504c. The new ranking/score reflects which of the catalog retail items 504a, 504b, 504c are most visually similar to the image item and has the score corresponding to the most important item attributes. In some examples, the re-ranked/final order may be the same as the initial ranked order of recommendations. In some examples, the re-ranked/final order may be different from the initial ranked order of recommendations.

In a particular example as shown, catalog retail item 504b was scored/ranked "2" from the initial visual search, but after attribute-based re-ranking, catalog retail item 504b is scored/ranked "1."

In some examples where there are more than one image item recognized from a single input image, then the process 500 may be performed for each of the image items to determine a re-ranked list of catalog retail item recommendations.

In some examples, one or more of the re-ranked recommended catalog retail items 504a, 504b, 504c are presented on a user interface 526 (e.g. a user website or shopping application). In same examples, user interface 526 may be as described in FIGS. 1 and 6. In some examples, only the highest ranked catalog retail item (for example, catalog retail item 504b) may be presented on the user interface 526.

In some examples, display of a catalog retail item 504a, 504b, 504c on the user interface 526 may be conditional on an availability condition of the catalog retail item. For example, if catalog retail item 504b is to be displayed on user interface 526, but is not available (for example, because it is out of stock, it has a delivery date past a threshold, it has been recalled, etc.), then no catalog retail item may be displayed or another catalog retail item may be displayed, such as catalog retail item 504a.

Figure 6:
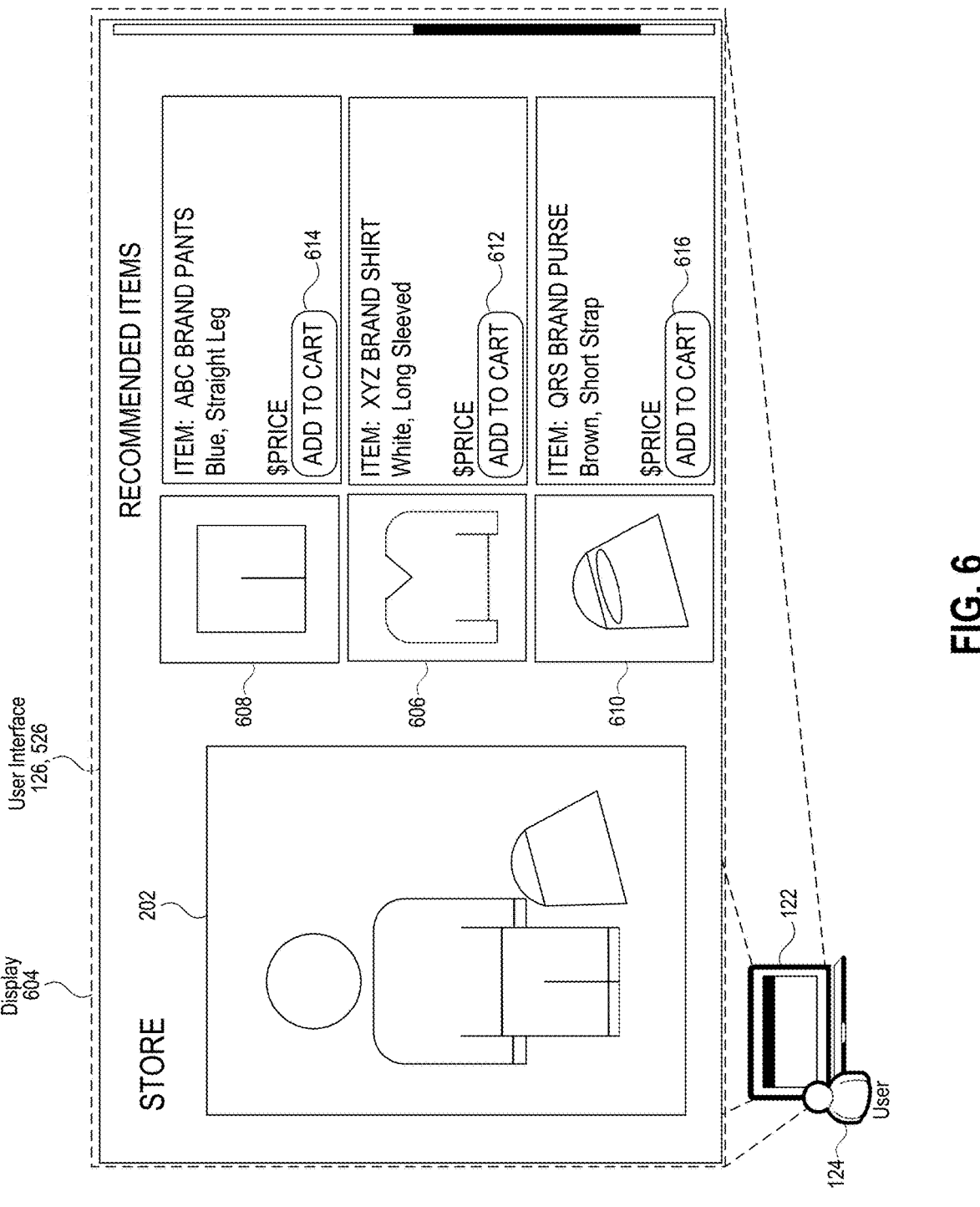
FIG. 6 illustrates an example user interface depicting retail items recommended as similar to items identified in an image, according to an example.

FIG. 6 illustrates an example user interface depicting retail items recommended as similar to items identified in an image. User interface 126, 526 may be displayed via display 604 of device 122 to user 124.

In some examples, user interface 126, 526 may display the received input image 202. In some examples, user interface 126, 526 may display a list of one or more recommended retail items 606, 608, 610 similar to items recognized in the input image 202, where the recommended retail items 606, 608, 610 are items of the retail enterprise's retail catalog. In some examples, photos of the recommended items 606, 608, 610 may be displayed. In some examples, information may be displayed about each of the recommended items 606, 608, 610, including item name, brand of item, and/or select attributes of the item. In some examples, a price of each of the recommended items 606, 608, 610 may be displayed. In some examples, a shipping option may be displayed (for example, whether the item is available in a store and/or for delivery or pickup). In some examples, a button or other selection means may be displayed that a user 124 may interact with in order to automatically initiate purchase of the item. In some examples, a button 612, 614, 616 or other selection means may be displayed that a user 124 may interact with in order to add the item to a virtual shopping cart. In some examples, a further selection option is displayed for each recommended item, for example, a means to select a size, color, or other attribute of the recommended item recommended item 606, 608, 610. In some examples, a user 124 may be able to interact with (for example, click on or select) a recommended item picture, name, or information panel and may be directed to a web page specific to that recommended item 606, 608, 610 which may allow the user 124 to view more detailed information about that item (for example, additional photos, product details, specifications, or customer reviews).

In a particular example as shown, a user interface 126, 526 may display the received input image 202 including a person wearing a shirt and pants/trousers and carrying a handbag. In the particular example, three recommended retail items are displayed, including a shirt 606, a pair of pants/trousers 608, and a handbag 610. Information is displayed for each of the recommended items, and user 124 may determine whether or not to purchase any of the recommended retail items which are similar or the same as the ones worn/held by the person in the input image 202. The information displayed and the photos may assist the user 124 in making that decision. For example, user 124 may decide to purchase the shirt 606, because it is a white, long sleeved shirt, even though it has a different neckline from the shirt in the input image 202; user 124 may alternatively decide not to purchase the purse/handbag 610, because although it is also brown with a short strap (presumably like the one in input image 202), it has another characteristic that user 124 does not like, or perhaps the price is more than user 124 wants to spend. User 124 may interact with buttons 612, 614, 616 if user 124 desires to purchase any of the recommended items 606, 608, 610, to add each of them to a virtual shopping cart in, a particular example.

In some examples, only recommended retails items 606, 608, 610 are displayed which are available for purchase (for example, in stock) at the store. In some examples, where a further selection option is displayed, selection of the further selection option may cause the displayed recommended item 606, 608, 610 to become unavailable. In such an example, the user interface may then recommend a different recommended retail item which was ranked lower after the attribute-based re-ranking, but which is available for purchase. For example, if user 124 desires to purchase shirt 606 (which may correspond to first-ranked catalog retail item 504b as earlier described), and selects an option for a size small, but a size small is out of stock, user interface 126, 526 may then display a notification of the unavailability of the size small, and may display a new recommended retail item for purchase which may correspond to catalog retail item 604a (second-ranked, as earlier described).

FIG. 7 illustrates an example method for recommending retail items similar to identified items in an image. The method 700 may be performed by one or more systems of the systems as shown and described with respect to FIGS. 1-6.

Method 700 begins at step 702, where an image is received. The image (for example, input image 202) may be received by an object detection model (for example, such as object detection model 106) and may depict one or more unlabeled retail items.

In some examples, the item is a retail item included within the retail catalog. In some examples, the item is not included within the retail catalog. In some examples, the image was provided to an enterprise by a first user. In some examples, the first user may be a social media user who posts/uploads the image to a webpage and/or links it to the enterprise through the use of a tag (such as a hashtag or @). In some examples, the first user is a marketing user, advertising user, or sales user of the enterprise.

At step 704, object detection is performed on the images. In some examples, object detection is performed by a model (for example, such as object detection model 106). In some examples, object detection is done in a process such as that outlined in FIG. 3. In some examples, the object detection model is trained using a dataset of images depicting items of a same type or similar type as items included within the retail item catalog. In some examples, the object detection model is trained using a dataset of retail apparel items.

In some examples, an area of the image is identified, the area being a sub-region of the image that includes an item from among the one or more unlabeled retail items. In some examples, the area has a boundary. In some examples, a plurality of areas of the image are identified, each of the plurality of areas corresponding to a different item from among the one or more unlabeled retail items. For example, a second area of the image may be identified, where the second area corresponds to a second retail item depicted within the image, the second area having a second boundary that is different from the boundary of the first area. In some examples the second area does not overlap with the first area. In some examples, the second area may overlap the first area at least in part. In some examples, no areas of the image are identified which correspond to a detected item. In some examples, one or more areas of the image are identified which correspond to detected items.

At step 706, an image may be cropped to extract detected objects/items. In some examples, detected objects/items may be cropped in a process such as that outlined in FIG. 3.

FIG. 8 further illustrates an example method for identifying and extracting an object from an image (for example, input image 202). Referring now to FIG. 8, at step 802, one or more image areas are identified. Each image area may be flagged as to potentially contain an item. At step 804, bounding boxes are generated. Bounding boxes may be generated around identified image areas. In some examples, areas of interest may be identified and bounding boxes generated by an application such as RPN 308 as described above.

At step 806, a determination is made whether overlap exists between bounding boxes, between image areas, and/or between potentially identified items. In some examples, less than an entirety of the item is visible within the image. For example, an image may be of a person wearing a shirt with a jacket over it, or wearing a scarf over a shirt. In such an example, the image areas or bounding boxes of the identified shirt/jacket/scarf may overlap.

If overlap exists, then a confidence of the partial object is determined. In some examples, if only a small portion of the item is within the bounding box/item area (for example, fewer pixels than a predetermined threshold amount of pixels), then a lower confidence may be assigned to that partial object. The image is then cropped at step 810. If overlap does not exists, then the image is cropped at step 810. In some examples, an image is only cropped if the confidence level is above a predetermined threshold.

At step 810, an image is cropped to extract a detected item (for example, the pixels that correspond to an extracted item) from the remainder of the image which corresponds to a different detected item or to no detected item at all. Each cropped image has a boundary.

At step 812, cropped image embedding vectors are generated. In some examples, generating the set of embedding vectors includes applying a learning model trained on images included within the retail item catalog.

Referring back to FIG. 7, at step 708, embedding vectors associated with the area within the cropped boundary are generated (as described above, for example as in FIGS. 2 and 4), and a category of the item within the area is predicted. The embedding vectors are representative of the item predicted to be located within the cropped boundary.

In some examples, the category may be predicted using a model. The model may be trained using a dataset of images included within a retail item catalog of a retail enterprise, where each retail item has a plurality of retail item attributes associated with it.

At step 710, embedding vectors are compared to catalog embeddings. FIG. 9 further illustrates an example method for assigning similarity rankings to catalog items.

Referring now to FIG. 9, at step 902, a set of selected embedding vectors (or, in some examples, a plurality of sets of embedding vectors) in the predicted category is received. In some examples, each set of catalog item embedding vectors is associated with an image of a retail item that is included within the retail item catalog (for example, item catalog database 116, 416). In some examples, one or more sets of catalog item embedding vectors are received from a database selected from among a plurality of catalog item embedding databases based, at least in part, on the predicted category of the item (refer also to FIG. 4).

At step 904, catalog item embedding vectors are compared to the area embedding vectors representative of the (image) item. A set of images of catalog retail items included within the retail item catalog are determined, which are visually similar to the area of the image including the item. The set of images of catalog retail items is associated with a corresponding set of catalog retail items within the catalog retail item catalog.

In some examples, comparing the set of embedding vectors representative of the item to each of the plurality of sets of catalog retail item embedding vectors comprises performing a k-nearest neighbors (kNN) technique (for example, nearest neighbor calculation 406 as described above) to generate a similarity rank.

At step 906, similarity ranks are assigned to catalog (retail) items based on vector similarity (similarity between the catalog embedding vectors and the area vectors, as based on the comparison of the respective vector sets). Refer also to FIG. 4.

Referring back to FIG. 7, at step 712, one or a plurality of item attributes associated with the item (of the image) are determined (for example, as described regarding attribute determination 404 above). In some examples, the plurality of item attributes have a common attribute type with one or more retail items included within the retail item catalog that are in the predicted category of the item. For example, in a retail catalog including items in a category of apparel, attribute types may include color, length, neckline, or others; at lest one of the plurality of attributes may also include one or more of the same attribute types.

The item attributes are compared to attributes of the retail items using attribute weights. FIG. 10 further illustrates an example method for assigning rankings to catalog items based on weighted attributes. Refer also to FIGS. 4 and 5. Referring now to FIG. 10, at step 1002, catalog item attributes are obtained; one or more catalog item attributes may be associated with a catalog item. In some examples, catalog item attributes may be obtained from a database such as item catalog database 422. Attribute determination and ranking may be performed, in some examples, by an application such as attribute determination and ranking application 110.

At step 1004, per-attribute weightings are applied. In some examples, each of the retail item attribute types has assigned to it a predetermined attribute weight. In an example, an attribute type may be assigned a greater or lesser weight based on customer preference data of the retail enterprise and/or customer feedback data and/or marketing considerations (for example, seasonality). These weights are applied to the attributes of each attribute type associated with the initially ranked catalog retail items.

In some examples, an updated set of customer preference data related to a user interaction with a recommendation is received, and the predetermined attribute weighting is updated based on the second set of customer preference data.

At step 1006, attributes of the (image area) item are compared to the weighted attributes of the catalog retail items. Based on (a) the comparison of the retail item attributes to the corresponding item attributes of the item and (b) the predetermined weighted attribute values, one or more attribute scores/ranks is assigned to each retail item of the set of retail items. Refer to the discussion of weighted average scoring 508, above.

In some examples, steps 1002 through 1006 may be repeated for each item in the set, where more than one item is detected in the input image.

At step 1008, the catalog retail items are re-ranked within the determined category for the item, based on the weighted attributes. A final ranking may be assigned to each retail item (of a set of the retail items, in some examples), based on the similarity rank and the one or more attribute scores assigned to each retail item. Referring back to FIG. 7, at step 714, catalog retail items are re-ranked (as described above), and one or more of the highest-ranking catalog retail item (or items) is recommended, based on the final ranking.

In some examples, the one or more recommended retail items are included within the retail item catalog of the retail enterprise.

In some examples, an identification of the one or more recommended retail items is transmitted to a web server hosting a retail website of the retail enterprise. In some examples, the retail web server is communicatively connected to the computing system on which the retail item matching system is implemented. In some examples, at a retail web server, a user interface (for example, user interface 126, 526) is generated which may include the image, the recommended retail item, and an option to purchase the recommended retail item. In some examples, the recommended retail item is not available within the retail item catalog (for example, is not being offered for sale or is out of stock) and is not offered for sale (purchase by the user) via the retail web server (is not displayed on the user interface).

In some examples, the user interface is presented to a user (for example, user 124) who is not the same as the first user from whom the enterprise received the image. In some examples, the user is a customer or potential customer user who may desire to purchase a retail item similar or the same as one depicted in the input image.

FIG. 11 illustrates an example method for detecting degradation of quality of a model output and retraining the model. The method 1100 may be performed by one or more systems of the systems and processes as shown and described with respect to FIGS. 1-6, 12. In some examples, monitoring and initiation of model retraining may be performed by an application such as performance monitoring/model training application 112.

Method 1100 begins at step 1102, where one or more user selections of items are received at a retail website. For example, a plurality of items may be recommended to a user as predicted to be similar to items detected in an image. The user may have selected one or more of the recommended items for purchase.

At step 1104, metrics are calculated, relating to performance of the model(s) which in whole or in part selected the recommended retail items and the quality of the recommendations. Metrics may include precision of item identification and cropping, accuracy of category prediction, accuracy of item attribute determination, relevancy of recommended items, and others. Refer also to metric calculation 1204.

At step 1106, metrics (in some examples, including performance metrics, quality metrics, data at static points, and/or data trends over time) are saved. Refer also to Save Metrics 1206 and Database Storage Infrastructure 1220.

At step 1108, metrics are visualized and monitored. Visualization of the metrics may include presenting graphs, charts, or other data to applications and/or application owners/users. Visualized data may show performance over time, including increased or decreased performance, event-based changes in performance, drifts in performance, and/or performance as related to a predetermined threshold. In some examples, metrics may be published and/or messages including metrics data may be transmitted. In some examples, alerts may be generated and transmitted based on monitored metrics reaching a predetermined threshold. Refer also to Visualization 1208 and Measurement Infrastructure 1230.

At step 1110, a determination is made whether degradation is detected. If degradation is not detected, then the monitoring of the metrics (for example, as in step 1108), continues. The determination may include determining that at least one performance metric of the learning model falls below a predetermined threshold. In some examples, performance metrics may include a precision metric defined as a proportion of recommended items within a top predetermined number of items. In some examples, performance metrics may include a recall metric defined as a proportion of relevant items within the top predetermined number of items. In some examples, performance metrics may include a lift metric corresponding to effectiveness of the learning model based on a rate of user selection of the one or more recommended retail items. Refer also to Metric Calculation 1204 and Initiate Retraining 1212.

If degradation is detected, automatically performing a re-training process on the learning model may be initiated at step 1112. For example, a retraining pipeline may be called, as described below in FIG. 12. Once retraining is complete, the retrained model may by integrated in step 1114.

FIG. 12 illustrates an example process flow for detecting degradation of quality of a model output and retraining the model. System 1200 may be as described with regards to performance monitoring/model training application 112 of the visual search system 102. Performance monitoring (and subsequent re-training of models, as described in FIG. 11 and below), ensures that models within the disclosed systems can accurately identify, categorize, and assign attributes to items within images, and can recommend retail items beneficial to a consumer user. Monitoring and retraining also ensures that the models remain up to date with changes in retail item catalog data, as items are added or removed from the catalog. Additional discussion of a process for monitoring model behavior and initiating model re-training can be found in Vishal Vijay Shanker et al., *Model Monitoring: Ensure Robust Machine Learning Systems in Production*, pp. 1-4, which is incorporated by reference in its entirety.

In some examples, a model monitoring library 1202 may monitor the performance of one or more models, including models described above with regards to the systems and processes described in FIGS. 1-5. Model monitoring library 1202 may, in some examples, log and monitor the model performance (including quality data) to identify when the model performance has degraded to a point when it must be retrained in order to provide relevant recommended items and may keep track of drift in performance/quality over time. This may allow enterprise users to retrain models, identify root causes of problems, and retain models in a timely manner to maintain high quality recommendations.

At metric calculation 1204, metrics (for example, precision of item identification and cropping, accuracy of category prediction, accuracy of item attribute determination, and/or relevancy of recommended items) may be calculated. Machine learning models may generate predictions or inferences, which may be utilized, along with corresponding ground-truth data, to calculate machine learning metrics.

In an example, to evaluate the quality of item recommendations from a model, a precision@k term is defined as the proportion of recommended items in the top k relevant items. A recall@k term is defined, which is the proportion or relevant items found in the top k recommendations. A Lift term (how effective the predictive model is) is defined as the ratio between results obtained with and without the predictive model. When a precision@k term and/or a recall@k term drops below a predefined threshold, the associated model may be retrained as described below, and a subsequent rise in the value of the precision@k and/or recall@k terms may be visualized.

The metrics (and, in some examples, any associated metadata) may be saved 1206 in one or more databases or other storage systems, such as database storage infrastructure 1220.

In some examples, applications of the present disclosure may visualize 1208 performance metrics and quality data over time. Measurement infrastructure 1230 may publish calculated metrics and data on a metrics dashboard 1232 and/or send related messages, alerts, or other publications (metrics data publication/messaging 1234). In some examples, this metrics dashboard 1232 is visible to an enterprise user. In some examples, alerts may be generated if a particular model performance or data quality metric falls below (or above) a predetermined threshold. In some examples, alerts may be transmitted to applications. In some examples, alerts may be transmitted to application owners (enterprise users). In some examples, an alert triggers initiation of the retraining process 1212 (see below). The performance of the machine learning applications may be improved, by automatically updating the model after automatic retraining when necessary, and when continuing with the existing model when appropriate (i.e. when no performance degradation is viewed).

In some examples, an enterprise user may be performing troubleshooting or otherwise investigating performance of a particular model. Model observability may be increased for that model, in some examples for a temporary period of time. Metrics may include input data metrics, data quality metrics, model training metrics, model testing metrics at training time, and/or inference time metrics.

If degradation is detected in one or more of the calculated metrics, a re-training process may be initiated 1212 for the relevant model. This may automatically initiate a Training Pipeline 1240 to retrain the relevant model.

Model retraining may be performed on existing, new, or updated/modified dataset. For example, new datasets may include new images, items, attributes, and/or other data. In an example, training datasets may include images and/or attributes of retail items new to an enterprise catalog. In an example, training datasets may include images which include identification of items which are obscured by other objects or items, or in which only part of an item is otherwise visible. In an example, training datasets may include image which have been transformed to change parameters such as lighting, occlusions, clarity, or cropping, so when a transformed training image more closely simulates a "wild" image (for example, an image captured by a social media user), so that a model retrained using such a transformed dataset may perform more accurately on other "wild" images.

Once the model has been retrained, the new, updated model may be published 1242, and may be again utilized as part of the systems, processes, and methods disclosed herein.

Figure 13:
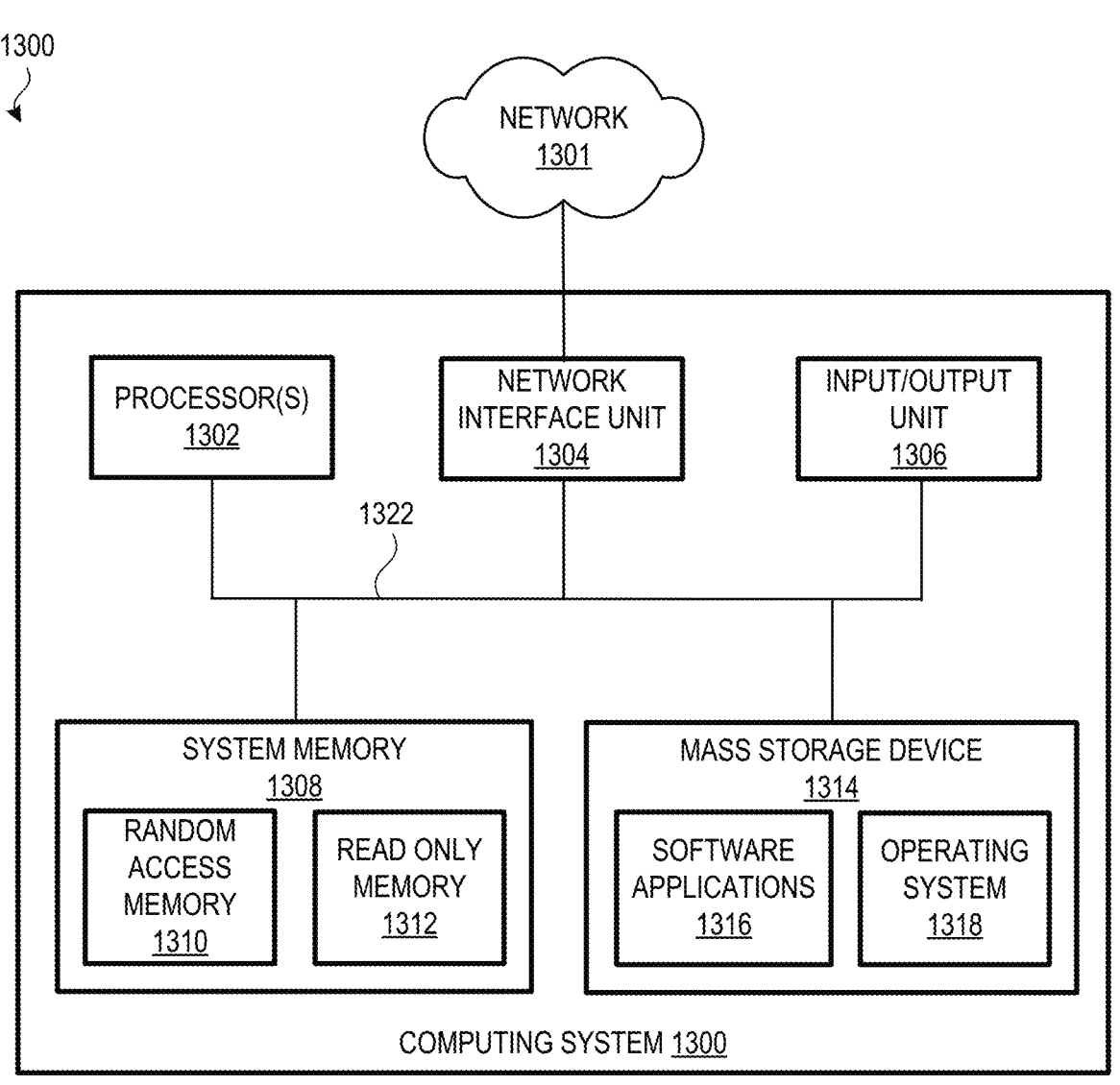
FIG. 13 illustrates an example block diagram of a computing system.

FIG. 13 illustrates an example block diagram of a virtual or physical computing system 1300. One or more aspects of the computing system 1300 can be used to implement the visual search system 102, store instructions described herein, and preform operations described herein.

In the embodiment shown, the computing system 1300 includes one or more processors 1302, a system memory 1308, and a system bus 1322 that couples the system memory 1308 to the one or more processors 1302. The system memory 1308 includes RAM (Random Access Memory) 1310 and ROM (Read-Only Memory) 1312. A basic input/output system that contains the basic routines that help to transfer information between elements within the computing system 1300, such as during startup, is stored in the ROM 1312. The computing system 1300 further includes a mass storage device 1314. The mass storage device 1314 is able to store software instructions and data. The one or more processors 1302 can be one or more central processing units or other processors.

The mass storage device 1314 is connected to the one or more processors 1302 through a mass storage controller (not shown) connected to the system bus 1322. The mass storage device 1314 and its associated computer-readable data storage media provide non-volatile, non-transitory storage for the computing system 1300. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1300.

According to various embodiments of the invention, the computing system 1300 may operate in a networked environment using logical connections to remote network devices through the network 1301. The network 1301 is a computer network, such as an enterprise intranet and/or the Internet. The network 1301 can include a LAN, a Wide Area Network (WAN), the Internet, wireless transmission mediums, wired transmission mediums, other networks, and combinations thereof. The computing system 1300 may connect to the network 1301 through a network interface unit 1304 connected to the system bus 1322. It should be appreciated that the network interface unit 1304 may also be utilized to connect to other types of networks and remote computing systems. The computing system 1300 also includes an input/output controller 1306 for receiving and processing input from a number of other devices, including a touch user interface display screen, or another type of input device. Similarly, the input/output controller 1306 may provide output to a touch user interface display screen or other type of output device.

As mentioned briefly above, the mass storage device 1314 and the RAM 1310 of the computing system 1300 can store software instructions and data. The software instructions include an operating system 1318 suitable for controlling the operation of the computing system 1300. The mass storage device 1314 and/or the RAM 1310 also store software instructions, that when executed by the one or more processors 1302, cause one or more of the systems, devices, or components described herein to provide functionality described herein. For example, the mass storage device 1314 and/or the RAM 1310 can store software instructions that, when executed by the one or more processors 1302, cause the computing system 1300 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of generating retail item recommendations, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computing system, comprising:
   at least one processor; and
   at least one memory storing computer-executable instructions for recommending retail items similar to identified items in an image, the computer-executable instructions when executed by the at least one processor causing the computer to:
   transform a first dataset of images by adding item definitions and annotated attributes, wherein the first dataset of images depicts items of a same type or similar type as items included within a retail item catalog;
   create a first training set comprising the transformed first dataset of images;
   train, at a performance monitoring and model training application, an object detection model using the first training set;
   transform a second dataset of images by assigning attributes, wherein the second dataset of images depicts retail items within a retail item catalog;
   create a second training set comprising the transformed second dataset of images;
   train, at the performance monitoring and model training application, an image similarity model using the second training set;
   receive an image at the object detection model, the image depicting one or more unlabeled retail items;
   identify, by the object detection model, at least one area of the image, the area being a sub-region of the image and including an item from among the one or more unlabeled retail items;
   generate a bounding box around each identified area;
   when more than one area is identified, determine whether an overlap exists between bounding boxes;
   when an overlap between bounding boxes is not detected, crop the image to extract each identified retail item;
   when an overlap between bounding boxes is detected, determine a confidence score of a partial object, wherein the confidence score is based at least in part on the number of pixels within the bounding box;
   when the confidence score exceeds a predetermined level, crop the image to extract at least one partial object of the one or more identified retail items;
   receive, at a category and embedding data application, the cropped image segment;
   predict a category of the item within the area using the image similarity model;
   generate a set of embedding vectors, using numerical representations based on pixel information, associated with the area within the boundary, the embedding vectors being representative of the item;
   receive, at a visual similarity search application, a plurality of sets of catalog item embedding vectors, wherein each set of catalog item embedding vectors from among the plurality of sets of catalog item embedding vectors is associated with an image of a retail item that is included within the retail item catalog;

compare the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog;

based on the comparison, assign a similarity rank to each retail item of the set of retail items;

determine a plurality of item attributes associated with the item;

compare the retail item attributes associated with each item of the set of retail items to corresponding item attributes from among the plurality of item attributes of the item to obtain a plurality of attribute similarity scores, each of the retail item attributes having assigned to it a predetermined attribute weighting;

based on (a) the comparison of the retail item attributes to the corresponding item attributes of the item and (b) the predetermined weighted attribute values, assign, at a weighted average scoring application, one or more attribute scores to each retail item of the set of retail items;

assign a final ranking to each retail item of the set of the retail items, based on the similarity rank and the one or more attribute scores assigned to each retail item;

identify one or more recommended retail items of the set of retail items based on the final ranking;

calculate performance metrics relating to the performance of the object detection model and the image similarity model; and when at least one performance metric of the object detection model or of the image similarity model falls below a predetermined threshold, automatically perform a re-training process on the respective model using updated datasets containing images of new items to the retail item catalog.

2. The computing system of claim 1, wherein the plurality of item attributes have a common attribute type with one or more retail items included within the retail item catalog that are in the predicted category of the item.

3. The computing system of claim 1, wherein the object detection model is trained using a dataset of retail apparel items.

4. The computing system of claim 1, wherein a plurality of areas of the image are identified, each of the plurality of areas corresponding to a different item from among the one or more unlabeled retail items.

5. The computing system of claim 1, wherein less than an entirety of the item is visible within the image.

6. The computing system of claim 1, wherein the item is a retail item not included within the retail catalog, and wherein the one or more recommended retail items are included within the retail item catalog of the retail enterprise.

7. The computing system of claim 1, further comprising transmitting an identification of the one or more recommended retail items to a web server hosting a retail website of the retail enterprise.

8. The computing system of claim 1, further comprising instructions to, concurrently with identifying the area of the image, identify a second area of the image, wherein the second area corresponds to a second retail item depicted within the image, the second area having a second boundary that is different from the boundary, wherein the second area does not overlap with the first area.

9. The computing system of claim 1, wherein the image is provided to an enterprise by a first user and wherein a user interface is presented to a second user.

10. The computing system of claim 1, further comprising a plurality of catalog item embedding databases, and wherein the plurality of sets of catalog item embedding vectors are received from a database selected from among a plurality of databases based, at least in part, on the predicted category of the item.

11. The computing system of claim 1, wherein the dataset of images used to train the object detection model includes apparel images.

12. A method, comprising:

transforming a first dataset of images by adding item definitions and annotated attributes, wherein the first dataset of images depicts items of a same type or similar type as items included within a retail item catalog;

creating a first training set comprising the transformed first dataset of images;

training, at a performance monitoring and model training application, an object detection model using the first training set;

transforming a second dataset of images by assigning attributes, wherein the second dataset of images depicts retail items within a retail item catalog;

creating a second training set comprising the transformed second dataset of images;

training, at the performance monitoring and model training application, an image similarity model using the second training set;

receiving an image at the object detection system, the image depicting one or more unlabeled retail items;

identifying, via the object detection model, at least one area of the image, the area being a sub-region of the image and including an item from among the one or more unlabeled retail items;

generating a bounding box around each identified area;

when more than one area is identified, determining whether an overlap exists between bounding boxes;

when an overlap between bounding boxes is not detected, cropping the image to extract each identified retail item;

when an overlap between bounding boxes is detected, determining a confidence score of a partial object, wherein the confidence score is based at least in part on the number of pixels within the bounding box;

when the confidence score exceeds a predetermined level, cropping the image to extract at least one partial object of the one or more identified retail items and;

receiving, at a category and embedding data application, the cropped image segment;

predicting a category of the item within the area using the image similarity model;

generating a set of embedding vectors, using numerical representations based on pixel information, associated with the area within the boundary, the embedding vectors being representative of the item;

receiving, at a visual similarity search application, a plurality of sets of catalog item embedding vectors, wherein each set of catalog item embedding vectors from among the plurality of sets of catalog item embedding vectors is associated with an image of a retail item that is included within the retail item catalog;

comparing the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog;

based on the comparison, assigning a similarity rank to each retail item of the set of retail items;

determining a plurality of item attributes associated with the item;

comparing the retail item attributes associated with each item of the set of retail items to corresponding item attributes from among the plurality of item attributes of the item to obtain a plurality of attribute similarity scores, each of the retail item attributes having assigned to it a predetermined attribute weighting;

based on (a) the comparison of the retail item attributes to the corresponding item attributes of the item and (b) the predetermined weighted attribute values, assigning, at a weighted average scoring application, one or more attribute scores to each retail item of the set of retail items;

assigning a final ranking to each retail item of the set of the retail items, based on the similarity rank and the one or more attribute scores assigned to each retail item;

identifying one or more recommended retail items of the set of retail items based on the final ranking;

calculating performance metrics relating to the performance of the object detection model and the image similarity model; and when at least one performance metric of the object detection model or of the image similarity model falls below a predetermined threshold, automatically performing a re-training process on the respective model using updated datasets containing images of new items to the retail item catalog.

13. The method of claim 12, wherein generating the set of embedding vectors includes applying a learning model trained on images included within the retail item catalog.

14. The method of claim 13, wherein comparing the set of embedding vectors representative of the item to each of the plurality of sets of catalog item embedding vectors comprises performing a k-nearest neighbors (kNN) technique to generate the similarity rank.

15. The method of claim 13, wherein the at least one performance metric includes one or more of:

a precision metric defined as a proportion of recommended items within a top predetermined number of items;

a recall metric defined as a proportion of relevant items within the top predetermined number of items;

a lift metric corresponding to effectiveness of the learning model based on a rate of user selection of the one or more recommended retail items.

16. The method of claim 12, further comprising generating, at a retail web server, a user interface including the image, the recommendation, and an option to purchase the recommended retail item.

17. The method of claim 16, wherein the item is not available within the retail item catalog, and not offered for sale via the retail web server.

18. The method of claim 12, wherein the predetermined attribute weighting is based on customer preference data of a retail enterprise.

19. The method of claim 18, further comprising:

receiving an updated set of customer preference data related to a user interaction with a recommendation; and updating the predetermined attribute weighting based on the second set of customer preference data.

20. An item matching system for a retail website comprising:

an apparel item matching system implemented on a computing system, the apparel item matching system being configured to:

transform a first dataset of images by adding item definitions and annotated attributes, wherein the first dataset of images depicts items of a same type or similar type as items included within a retail item catalog;

create a first training set comprising the transformed first dataset of images;

train, at a performance monitoring and model training application, an object detection model using the first training set;

transform a second dataset of images by assigning attributes, wherein the second dataset of images depicts retail items within a retail item catalog;

create a second training set comprising the transformed second dataset of images;

train, at the performance monitoring and model training application, an image similarity model using the second training set;

receive an image at the object detection model, the image depicting one or more unlabeled retail items;

identify, by the object detection model, at least one area of the image, the area being a sub-region of the image and including an item from among the one or more unlabeled retail items;

generate a bounding box around each identified area;

when more than one area is identified, determine whether an overlap exists between bounding boxes;

when an overlap between bounding boxes is not detected, crop the image to extract each identified retail item;

when an overlap between bounding boxes is detected, determine a confidence score of a partial object, wherein the confidence score is based at least in part on the number of pixels within the bounding box;

when the confidence score exceeds a predetermined level, crop the image to extract at least one partial object of the one or more identified retail items;

receive, at a category and embedding data application, the cropped image segment;

predict a category of the item within the area using the image similarity model;

generate a set of embedding vectors, using numerical representations based on pixel information, associated with the area within the boundary, the embedding vectors being representative of the item;

receive, at a visual similarity search application, a plurality of sets of catalog item embedding vectors, wherein each set of catalog item embedding vectors from among the plurality of sets of catalog item embedding vectors is associated with an image of a retail item that is included within the retail item catalog;

compare the set of embedding vectors representative of the item to each of the plurality of sets of catalog item embedding vectors to determine a set of images of retail items included within the retail item catalog that are visually similar to the area of the image including the item, the set of images of retail items being associated with a corresponding set of retail items within the retail item catalog;

based on the comparison, assign a similarity rank to each retail item of the set of retail items;

determine a plurality of item attributes associated with the item;

compare the retail item attributes associated with each item of the set of retail items to corresponding item attributes from among the plurality of item attributes of the item to obtain a plurality of attribute similarity scores, each of the retail item attributes having assigned to it a predetermined attribute weighting;

based on (a) the comparison of the retail item attributes to the corresponding item attributes of the item and (b) the predetermined weighted attribute values, assign, at a weighted average scoring application, one or more attribute scores to each retail item of the set of retail items;

assign a final ranking to each retail item of the set of the retail items, based on the similarity rank and the one or more attribute scores assigned to each retail item;

identify one or more recommended retail items of the set of retail items based on the final ranking;

calculate performance metrics relating to the performance of the object detection model and the image similarity model; and when at least one performance metric of the object detection model or of the image similarity model falls below a predetermined threshold, automatically perform a re-training process on the respective model using updated datasets containing images of new items to the retail item catalog; and a retail web server communicatively connected to the computing system on which the apparel item matching system is implemented, the retail web server being configured to generate a user interface including the image, the recommendation, and an option to purchase the recommended retail item.

* * * * *